(12) United States Patent
Ishizuka et al.

(10) Patent No.: US 7,021,278 B2
(45) Date of Patent: Apr. 4, 2006

(54) FUEL INJECTION SYSTEM

(75) Inventors: Koji Ishizuka, Kariya (JP); Takayuki Fukushima, Okazaki (JP); Kenichiro Nakata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/169,730

(22) Filed: Jun. 30, 2005

(65) Prior Publication Data

US 2006/0005816 A1 Jan. 12, 2006

(30) Foreign Application Priority Data

Jul. 12, 2004 (JP) .............................. 2004-204931

(51) Int. Cl.
*F02M 47/00* (2006.01)
(52) U.S. Cl. ...................... 123/299; 123/467
(58) Field of Classification Search .............. 123/467, 123/456, 299, 300, 500, 501, 496, 447
See application file for complete search history.

(56) References Cited

U.S. PATENT DOCUMENTS

| | | | | |
|---|---|---|---|---|
| 6,491,016 B1* | 12/2002 | Buratti | ........................ | 123/299 |
| 6,491,017 B1* | 12/2002 | Mahr et al. | ................... | 123/299 |
| 6,516,773 B1* | 2/2003 | Dutart et al. | ................ | 123/299 |
| 6,659,073 B1* | 12/2003 | Franke et al. | ................ | 123/299 |
| 6,672,278 B1* | 1/2004 | Zimmermann et al. | ..... | 123/299 |
| 6,705,278 B1* | 3/2004 | McGee et al. | ............... | 123/299 |
| 6,722,345 B1* | 4/2004 | Saeki et al. | .................. | 123/435 |
| 6,732,705 B1* | 5/2004 | Ebelsheiser et al. | ........ | 123/299 |
| 6,807,947 B1 | 10/2004 | Coates et al. | | |
| 6,840,211 B1* | 1/2005 | Takahashi | ................... | 123/299 |
| 6,904,893 B1* | 6/2005 | Hotta et al. | .................. | 123/447 |
| 6,938,607 B1* | 9/2005 | Nogi et al. | .................. | 123/299 |
| 2003/0213473 A1 | 11/2003 | Coates et al. | | |
| 2004/0237930 A1* | 12/2004 | Kawamura et al. | ......... | 123/299 |
| 2005/0120995 A1* | 6/2005 | Tsujimoto et al. | .......... | 123/299 |

FOREIGN PATENT DOCUMENTS

| | | |
|---|---|---|
| JP | 10-266888 | 10/1998 |
| JP | 2004-251272 | 9/2004 |

\* cited by examiner

*Primary Examiner*—Carl S. Miller
(74) *Attorney, Agent, or Firm*—Nixon & Vanderhye P.C.

(57) ABSTRACT

A fuel injection system includes an injector and a control device. The injector includes a control chamber that drive-controls a needle with a pressure therein. The control device determines a required injection amount in accordance with an operation state of an internal combustion engine, and controls a fuel injection amount injected from the injector through controlling an electric valve therein. The control device determines a geometric shape defined by a time axis and a lift-height change of the needle. The control device further divides the lift-height change of the needle during the period from when the needle starts moving up to when the needle starts moving down into a plurality of portions. The control device then evaluates the lift-height change of the needle in the plurality of portions based on a physical equation.

46 Claims, 7 Drawing Sheets

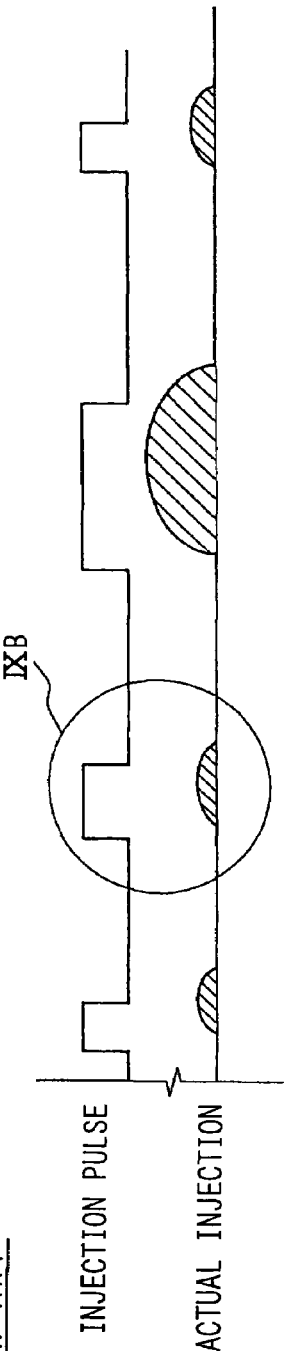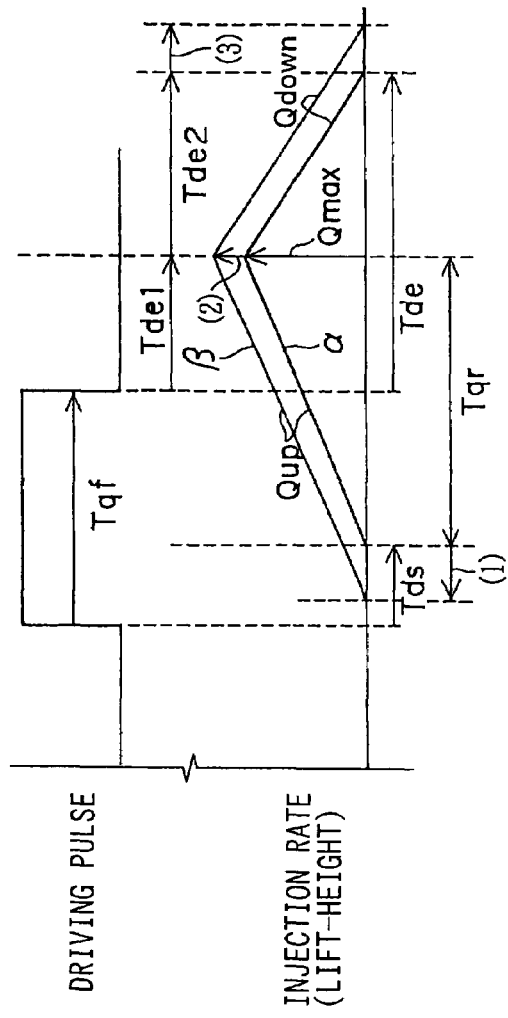
FIG. 9A
PRIOR ART
FIG. 9B
PRIOR ART

… (1)

FUEL INJECTION SYSTEM

CROSS REFERENCE TO RELATED APPLICATIONS

This application is based upon and claims the benefit of priority of Japanese Patent Application No. 2004-204931, filed on Jul. 12, 2004, the contents of which are incorporated herein by reference.

FIELD OF THE INVENTION

Embodiments of the present invention relate to a fuel injection system for injecting fuel into an internal combustion engine and, more particularly, to an opening-closing driving-control for determining an injector driving period between a driving signal generation timing of an injector to a driving signal termination timing.

BACKGROUND OF THE INVENTION

The conventional technology of a fuel injection system will be described with respect to multiple injections (a multistage injection in which the fuel injection is divided into a plurality of injections) as shown in FIG. 9A. When a plurality of fuel injections are performed in a predetermined injection period in one cycle as shown in FIG. 9A, the second and subsequent injections are influenced by the previous injection (a pulsation generated in the piping which supplies fuel into an injector), resulting in a change comprising a delay in injection starting and a delay in injection termination.

This will be explained with reference to the detailed drawing of FIG. 9B.

When a driving signal for the injector such as a driving pulse is sent to an injector, and if the injection is not influenced by a pulsation, the injection rate starts increasing at a point in time (required-injection starting timing) where an injection starting delay period Tds elapses after the driving pulse is generated, and the injection rate starts decreasing at a point in time where a valve closing pressure reaching period Tde1 elapses after the driving pulse is terminated. Therefore, the geometric shape defined by the injection rate is represented as a reference triangle α shown in FIG. 9B, and an actual injection amount Q' is given by an amount corresponding to the area of the reference triangle α (a required injection amount Q).

Generally, when the fuel pressure supplied to the injector is increased due to a pulsation, the injection starting delay period Tds becomes shorter as shown by an arrow (1) in FIG. 9B, and the injection starting timing becomes earlier. The maximum injection rate becomes larger as shown by an arrow (2) in FIG. 9B and a needle moving down period Tde2 becomes longer as shown by an arrow (3) in FIG. 9B. As a result, the geometric shape defined by the injection rate is represented by a large triangle β in FIG. 9B, and the actual injection amount Q' is given by an amount corresponding to the area of the large triangle β, which is larger than the required injection amount Q.

On the other hand, when the injection starting delay period Tds is extended due to the pulsation, the injection starting timing is delayed. In this case, the geometric shape defined by the injection rate becomes smaller than the reference triangle α, and the actual injection amount Q' becomes smaller than the required injection amount Q.

In a conventional method for evaluating an injector driving period Tqf, a base driving period is evaluated by use of a two-dimensional map of the injection rate and a common rail pressure (an example of a fuel supply pressure), and the base driving period is corrected by use of a two-dimensional correction map of the common rail pressure and an interval (a non-injection period from the total injection) provided for each injection period.

As mentioned above, the injector driving period Tqf has conventionally been determined through evaluating the base driving period by use of the two-dimensional map of the injection rate and the common rail pressure and correcting the base driving period by use of the two-dimensional correction map provided for each injection stage. Therefore, the number of the two-dimensional correction maps increases as the number of the injection stages increases, resulting in a disadvantageous increase in the man-hour for adaptation.

In addition, when only a part of the specifications of the injector is modified, the entire data for adaptation must be reevaluated. Therefore, a process for adaptation associated with the change in injector specifications becomes significantly complicated, causing the process for adaptation to be very inefficient. See, for example, Japanese Patent Laid-Open Publication No. Hei 10-266888.

SUMMARY OF THE INVENTION

The embodiments of the present invention have been made in view of the above and other circumferences, and have one aspect that provides a fuel injection system which can determine an injector driving period Tqf with high accuracy without placing an excessive computational load on a control device through modeling the operation of an injector, after the injection is started, by a geometric shape and evaluating the injector driving period Tqf by use of the geometric shape, and in which an adaptation process based on the specifications of the injector is facilitated.

In a fuel injection system according to one aspect of the present invention, upon determining a geometric shape of lift-height, the lift-height change of a needle in the period from when a needle starts moving up to when the needle starts moving down is divided into the lift-height change of the needle in a first lift-up period Tqr1 just after when the needle starts moving up, the lift-height change of the needle in a second lift-up period Tqr2 from the end of the first lift-up period Tqr1 to when the pressure in a control chamber becomes almost constant, and the lift-height change of the needle in a third lift-up period Tqr3 from the end of the second lift-up period Tqr2 to when the needle starts moving down, and the lift-height change of the needle in each of the first, second, and third lift-up periods Tqr1, 2, and 3 is evaluated by use of a physical equation.

Since the lift-height change of the needle in each of the first, second, and third lift-up periods Tqr1, 2, and 3 is evaluated through modeling the lift-height change of the needle by use of a physical equation, the geometric shape of lift-height can be determined with high accuracy. As a result, an injector driving period Tqf (or driving signal termination timing) can be evaluated with high accuracy.

Upon evaluating the injector driving period Tqf (or the driving signal termination timing), a correction map conventionally employee fur correcting a base driving period need not be provided. Therefore, if the number of injection stages in multiple injections is increased, the man-hour for adaptation can be reduced. In this manner, the injector driving period Tqf (or the driving signal termination timing) with high accuracy can be determined without placing an excessive computational load on a control device.

In addition, when a part of the specifications of an injector is modified, it is sufficient that only the adaptation parameter of the modified part is changed. Therefore, the adaptation process associated with a change in the specifications of the injector can be facilitated.

In a fuel injection system according to another aspect of the present invention, the needle is assumed to move up at a constant speed during the first lift-up period Tqr1, and the lift-height change of the needle during the first lift-up period Tqr1 is evaluated through approximating the lift-height change of the needle by a linear equation by use of the lift-up speed of the needle (a linear equation for evaluating a first lift-up waveform).

Since the lift-height change of the needle during the first lift-up period Tqr1 is evaluated through the use of the linear equation (the linear equation for evaluating the first lift-up waveform), the computational load on a control device can be reduced, and the man-hour for adaptation associated with a change in the specifications of an injector can be reduced.

In a fuel injection system according to another aspect of the present invention, the linear equation for evaluating the lift-height change of the needle (the linear equation for evaluating the first lift-up waveform) employs a nozzle hole flow rate Qff of the injector and a seat diameter Dns of the needle as a parameter for computation.

As the nozzle hole flow rate Qff increases, a decrease of the injection pressure (the pressure in a nozzle chamber) becomes larger, resulting in a decrease of the lift-up speed of the needle. Therefore, this decrease of the lift-up speed of the needle can be incorporated into the linear equation (the linear equation for evaluating the first lift-up waveform). In addition, as the seat diameter Dns increases, the upward force on the needle just after the needle starts moving up (just after the valve opening) increases, resulting in an increase in the lift-up speed of the needle. Therefore, this increase in the lift-up speed of the needle can also be incorporated into the linear equation (the linear equation for evaluating the first lift-up waveform). Thus, the geometric shape of lift-height can be determined with high accuracy.

In a fuel injection system according to another aspect of the present invention, a coefficient K1 for the seat diameter Dns is involved in the linear equation (the linear equation for evaluating the first lift-up waveform), and the effect of a piping pulsation generated in a high pressure fuel piping supplying high-pressure fuel to the injector is taken into account in the coefficient K1.

Since the effect of the piping pulsation can be taken into account in the upward force applied to the seat diameter Dns, the lift-height change of the needle in the first lift-up period Tqr1 can be evaluated with high accuracy.

In a fuel injection system according to another aspect of the present invention, the coefficient K1 for the seat diameter Dns is involved in the linear equation (the linear equation for evaluating the first lift-up waveform), and the effect of a control chamber pulsation generated in a control chamber is taken into account in the coefficient K1.

Since the effect of the control chamber pulsation can be taken into account in the upward force applied to the seat diameter Dns, the lift-height change of the needle in the first lift-up period Tqr1 can be evaluated with high accuracy.

In a fuel injection system according to another aspect of the present invention, the needle is assumed to move up along a quadratic curve during the second lift-up period Tqr2, and the lift-height change of the needle during the second lift-up period Tqr2 is evaluated through approximating the lift-height change of the needle by a quadratic equation by use of the lift-up speed of the needle (a quadratic equation for evaluating the second lift-up waveform).

Since the lift-height change of the needle during the second lift-up period Tqr2 is evaluated by use of the quadratic equation (the quadratic equation for evaluating the second lift-up waveform), the computational load on the control device can be reduced. In addition, the man-hour for adaptation associated with a change in the specifications of the injector can be reduced.

In a fuel injection system according to another aspect of the present invention, coefficients in the quadratic equation (the quadratic equation for evaluating the second lift-up waveform) are determined through solving simultaneous equations involving the gradients of the lift-up speed of the needle at both the ends of the second lift-up period Tqr2, and a lift-height Lm1 of the needle at the end of the first lift-up period Tqr1.

The gradients at both the ends can be determined through estimating the gradient (the lift-up rate) in the first and second lift-up periods Tqr1 and 2 in advance.

In a fuel injection system according to another aspect of the present invention, the quadratic equation (the quadratic equation for evaluating the second lift-up waveform) includes a correction coefficient for correcting an initial speed change of the needle due to the pressure drop in a nozzle chamber.

Since the initial speed change of the needle is evaluated by incorporating the effect of the pressure drop in the nozzle chamber, the lift-height change of the needle in the second lift-up period Tqr2 can be evaluated with high accuracy.

In a fuel injection system according to another aspect of the present invention, the correction coefficient for correcting the initial speed change of the needle is evaluated by use of the nozzle hole flow rate Qff of the injector, the seat diameter Dns of the needle, and the volume of a suction chamber.

Since the initial speed change of the needle is evaluated by incorporating the effect of the nozzle hole flow rate Qff of the injector, the seat diameter Dns of the needle, and the volume of the suction chamber, the lift-height change of the needle during the second lift-up period Tqr2 can be evaluated with high accuracy.

In a fuel injection system according to another aspect of the present invention, a required injection amount Q is represented by a fourth order equation with respect to the injection period upon determining the geometric shape of lift-height through approximating the lift-height change of the needle during the second lift-up period Tqr2 by use of the quadratic equation (the quadratic equation for evaluating the second lift-up waveform), and the injection period is determined from the required injection amount Q through a convergent computation.

Since the computation for solving the fourth order equation is replaced by the convergent computation, the computational load on the control device can be reduced.

In a fuel injection system according to another aspect of the present invention, the needle is assumed to move up at a constant speed during the third lift-up period Tqr3, and the lift-height change of the needle during the third lift-up period Tqr3 is evaluated through approximating the lift-height change of the needle by a linear equation by use of the lift-up speed of the needle (a linear equation for evaluating the third lift-up waveform).

Since the lift-height change of the needle during the third lift-up period Tqr3 is evaluated by use of the linear equation (the linear equation for evaluating the third lift-up waveform), the computational load on the control device can be reduced. In addition, the man-hour for adaptation associated with a change in the specifications of the injector can be reduced.

In a fuel injection system according to another aspect of the present invention, the linear equation for evaluating the lift-height change of the needle in the third lift-up period Tqr3 (the linear equation for evaluating the third lift-up waveform) is an equation in which the needle is assumed to move up at a constant speed while the pressure in the control chamber and the pressure in the nozzle chamber are balanced.

The computational load on the control device can be reduced through assuming the needle moves up at a constant speed while the pressure in the control chamber and the pressure in the nozzle chamber are balanced. In addition, the man-hour for adaptation associated with a change in the specifications of the injector can be reduced.

In a fuel injection system according to another aspect of the present invention, the linear equation for evaluating the lift-height change of the needle in the third lift-up period Tqr3 (the linear equation for evaluating the third lift-up waveform) is an equation in which the volume of the control chamber is assumed to be reduced by the difference between the inflow to the control chamber and the outflow from the control chamber while the pressure in the control chamber is held constant.

The computational load on the control device can be reduced through assuming the volume of the control chamber is reduced by the difference between the inflow to the control chamber and the outflow from the control chamber. In addition, the man-hour for adaptation associated with a change in the specifications of the injector can be reduced.

In a fuel injection system according to another aspect of the present invention, the pressure of the nozzle chamber in the linear equation (the linear equation for evaluating the third lift-up waveform) employs the nozzle hole flow rate Qff of the injector as a parameter for computation.

As the nozzle hole flow rate Qff increases, a drop of the injection pressure (the pressure in the nozzle chamber) becomes larger, resulting in a decrease of the lift-up speed of the needle. Therefore, this decrease of the lift-up speed of the needle can be incorporated into the linear equation (the linear equation for evaluating the third lift-up waveform), and the geometric shape of lift-height can be determined with high accuracy.

In a fuel injection system according to another aspect of the present invention, the control device divides an injection termination delay period Tde of the injector from when the driving signal is terminated to when the injection from the injector is completed into a first delay period Tde1' from when the driving signal is terminated to when the valve of an electric valve starts moving for valve closing, a second delay period Tde1" from when the valve of the electric valve starts moving for valve closing to when the needle starts moving down after the pressure in the control chamber reaches the valve closing pressure, and a third delay period Tde2 from when the needle starts moving down after the pressure in the control chamber reaches the valve closing pressure to when the needle stops moving down and the injection is terminated, and evaluates each of the first, second, and third delay periods Tde1', 1", and 2 by use of a simple physical equation.

Since a necessary response period of each part is individually evaluated through modeling each of the first, second, and third delay periods Tde1', 1", and 2 by use of a simple physical equation, the data size in the control device can be reduced. In addition, the computational load on the control device can be reduced.

When a part of the specifications of the injector is modified, it is sufficient that only the adaptation parameter of the modified part is changed. Therefore, the adaptation process associated with a change in the specifications of the injector can be facilitated.

In a fuel injection system according to another aspect of the present invention, a fixed value Tde1 (a lift-down delay period) is employed as the first and second delay periods Tde1' and 1".

The first delay period Tde1' is basically an electrical delay in the period from when the driving signal is terminated to when the valve of the electric valve starts the closing operation upon turning off the electric valve. This is independent of a fuel supply pressure Pc and is constant for injectors having the same specifications. Therefore, the first delay period Tde1' can be employed as a constant.

The second delay period Tde1" is the period related to the pressure drop in the control chamber. However, if a constant value is employed as the second delay period Tde1", the computational accuracy is not largely affected.

Therefore, if the fixed value Tde1 is employed as the first and second delay periods Tde1' and 1", the computational accuracy is not largely affected.

In this manner, the computational load on the control device can be reduced through employing a fixed value Tde1 as the first and second delay periods Tde1' and 1". In addition, the man-hour for adaptation associated with a change in the specifications of the injector can be reduced.

In a fuel injection system according to another aspect of the present invention, upon determining the geometric shape of lift-height having an area corresponding to the required injection amount Q, the control device evaluates the lift-height change of the needle during the third delay period Tde2, from when the needle starts moving down to when the needle stops moving down and the injection is terminated, through approximating the lift-height change of the needle by a linear equation (a linear equation for evaluating the lift-down waveform).

Since the lift-height change of the needle in the third delay period Tde2 is evaluated by use of the linear equation (the linear equation for evaluating the lift-down waveform), the computational load on the control device can be reduced. In addition, the man-hour for adaptation associated with a change in the specifications of the injector can be reduced.

In a fuel injection system according to another aspect of the present invention, the linear equation for evaluating the lift-height change of the needle in the third delay period Tde2 (the linear equation for evaluating the lift-down waveform) is an equation in which the needle is assumed to move down at a constant speed while the pressure in the control chamber and the pressure in the nozzle chamber are balanced.

The computational load on the control device can be reduced through assuming the needle moves down at a constant speed while the pressure in the control chamber and the pressure in the nozzle chamber are balanced. In addition, the man-hour for adaptation associated with a change in the specifications of the injector can be reduced.

In a fuel injection system according to another aspect of the present invention, the linear equation for evaluating the lift-height change of the needle in the third delay period Tde2 (the linear equation for evaluating the lift-down waveform) is an equation in which the volume of the control chamber is assumed to be increased by the difference between the inflow to the control chamber and the outflow from the control chamber while the pressure in the control chamber is held constant.

The computational load on the control device can be reduced through assuming the volume of the control chamber is increased by the difference between the inflow to the control chamber and the outflow from the control chamber while the pressure in the control chamber is held constant. In addition, the man-hour for adaptation associated with a change in the specifications of the injector can be reduced.

In a fuel injection system according to another aspect of the present invention, the pressure of the nozzle chamber in the linear equation (the linear equation for evaluating the lift-down waveform) employs the nozzle hole flow rate $Q_{ff}$ of the injector as a parameter for computation.

As the nozzle hole rate $Q_{ff}$ increases, a drop of the injection pressure (the pressure in the nozzle chamber) becomes larger, resulting in an increase in the lift-down speed of the needle. Therefore, this increase in the lift-down speed of the needle can be incorporated into the linear equation (the linear equation for evaluating the lift-down waveform).

In a fuel injection system according to another aspect of the present invention, the fuel supply pressure of the second and subsequent stages in multiple injections in which the fuel injection is divided into a plurality of stages employs a value evaluated through subtracting for each injection a pressure drop caused by the last injection from a base value which is an input value of the fuel supply pressure sensor at the starting timing of the fuel injection of the first stage.

In the second and subsequent stages in the multiple injections, a sensing error is generated in the input value of the fuel supply pressure sensor due to a pressure pulsation. However, the fuel supply pressure can be estimated through subtracting a pressure drop of the last injection. Therefore, the fuel supply pressure can be evaluated with high accuracy and a small error, and the geometric shape of lift-height can be determined with high accuracy.

In a fuel injection system according to another aspect of the present invention, the effect of a pulsation occurring on the fuel supply pressure in the second and subsequent stages is evaluated by use of a pulsation starting point obtained through shifting the end point of the last injection by a predetermined phase $\theta$.

In this manner, the fuel supply pressure can be evaluated with high accuracy. As a result, the geometric shape of lift-height can be determined with high accuracy.

In a fuel injection system according to another aspect of the present invention, the pulsation starting point of the first stage is also taken into account upon evaluating the effect of the pulsation occurring on the fuel supply pressure in the third and subsequent stages.

In this manner, the fuel supply pressure can be evaluated with high accuracy. As a result, the geometric shape of lift-height can be determined with high accuracy.

In a fuel injection system according to another aspect of the present invention, upon determining a geometric shape of injection rate of the injector, the injection rate change in the period from when the needle starts moving up to when the needle starts moving down is divided into the injection rate change in a first lift-up period $T_{qr1}$ just after when the needle starts moving up, the injection rate change in a second lift-up period $T_{qr2}$ from the end of the first lift-up period $T_{qr1}$ to when the pressure in a control chamber becomes almost constant, and the injection rate change in a third lift-up period $T_{qr3}$ from the end of the second lift-up period $T_{qr2}$ to when the needle starts moving down, and the injection rate change in each of the first, second, and third lift-up periods $T_{qr1}$, 2, and 3 is evaluated by use of a physical equation.

Since the injection rate change in each of the first, second, and third lift-up periods $T_{qr1}$, 2, and 3 is evaluated through modeling the injection rate change by use of a physical equation, the geometric shape of injection rate can be determined with high accuracy. As a result, the injector driving period $T_{qf}$ (or the driving signal termination timing) can be evaluated with high accuracy.

Upon evaluating the injector driving period $T_{qf}$ (or the driving signal termination timing), a correction map conventionally employed for correcting the base driving period need not be provided. Therefore, if the number of injection stages in multiple injections is increased, the man-hour for adaptation can be reduced. In this manner, the injector driving period $T_{qf}$ (or the driving signal termination timing) with high accuracy can be determined without placing an excessive computational load on a control device.

In addition, when a part of the specifications of an injector is modified, it is sufficient that only the adaptation parameter of the modified part is changed. Therefore, the adaptation process associated with a change in the specifications of the injector can be facilitated.

In a fuel injection system according to another aspect of the present invention, the injection rate is assumed to increase at a constant speed during the first lift-up period $T_{qr1}$, and the injection rate change during the first lift-up period $T_{qr1}$ is evaluated through approximating the injection rate change by a linear equation (a linear equation for evaluating a first lift-up waveform).

Since the injection rate change during the first lift-up period $T_{qr1}$ is evaluated through the use of the linear equation (the linear equation for evaluating the first lift-up waveform), the computational load on a control device can be reduced, and the man-hour for adaptation associated with a change in the specifications of an injector can be reduced.

In a fuel injection system according to another aspect of the present invention, the linear equation for evaluating the injection rate change in the first lift-up period $T_{qr1}$ (the linear equation for evaluating the first lift-up waveform) employs the nozzle hole flow rate $Q_{ff}$ of the injector and the seat diameter $D_{ns}$ of the needle as a parameter for computation.

As the nozzle hole flow rate $Q_{ff}$ increases, a drop of the injection pressure (the pressure in the nozzle chamber) becomes larger, resulting in a decrease of the lift-up speed of the needle. Therefore, this decrease of the lift-up speed of the needle can be incorporated into the linear equation (the linear equation for evaluating the first lift-up waveform). In addition, as the seat diameter $D_{ns}$ increases, the upward force on the needle just after the needle starts moving up (just after the valve opening) increases, resulting in an increase in the increasing speed of the injection rate. Therefore, this increase in the increasing speed of the injection rate can also be incorporated into the linear equation (the linear equation for evaluating the first lift-up waveform). Thus, the geometric shape of injection rate can be determined with high accuracy.

In a fuel injection system according to another aspect of the present invention, the coefficient $K_1$ for the seat diameter $D_{ns}$ is involved in the linear equation (the linear equation for evaluating the first lift-up waveform), and the effect of the piping pulsation generated in a high pressure fuel piping supplying high-pressure fuel to the injector is taken into account in the coefficient $K_1$.

Since the effect of the piping pulsation can be taken into account in the upward force applied to the seat diameter Dns, the injection rate change of the injector in the first lift-up period Tqr1 can be estimated with high accuracy.

In a fuel injection system according to another aspect of the present invention, the coefficient K1 for the seat diameter Dns is involved in the linear equation (the linear equation for evaluating the first lift-up waveform), and the effect of the control chamber pulsation generated in the control chamber is taken into account in the coefficient K1.

Since the effect of the control chamber pulsation can be taken into account in the upward force applied to the seat diameter Dns, the injection rate change of the injector in the first lift-up period Tqr1 can be estimated with high accuracy.

In a fuel injection system according to another aspect of the present invention, the injection rate is assumed to increase along a quadratic curve during the second lift-up period Tqr2, and the injection rate change during the second lift-up period Tqr2 is evaluated through approximating the injection rate change by a quadratic equation (a quadratic equation for evaluating a second lift-up waveform).

Since the injection rate change during the second lift-up period Tqr2 is evaluated by use of the quadratic equation (the quadratic equation for evaluating the second lift-up waveform), the computational load on the control device can be reduced. In addition, the man-hour for adaptation associated with a change in the specifications of the injector can be reduced.

In a fuel injection system according to another aspect of the present invention, coefficients in the quadratic equation (the quadratic equation for evaluating the second lift-up waveform) are determined through solving simultaneous equations involving the gradients of the injection rate at both the ends of the second lift-up period Tqr2, and an injection rate Lm1 at the end of the first lift-up period Tqr1.

The gradients at both the ends can be determined through estimating the gradient in the first and second lift-up periods Tqr1 and 2 (the increasing speed of the injection rate) in advance.

In a fuel injection system according to another aspect of the present invention, the quadratic equation (the quadratic equation for evaluating the second lift-up waveform) includes a correction coefficient for correcting an initial change of the injection rate due to the pressure drop in the nozzle chamber.

Since the initial change of the injection rate is evaluated through incorporating the effect of the pressure drop in the nozzle chamber, the injection rate change in the second lift-up period Tqr2 can be evaluated with high accuracy.

In a fuel injection system according to another aspect of the present invention, the correction coefficient for correcting the initial change of the injection rate is evaluated by use of the nozzle hole flow rate Qff of the injector, the seat diameter Dns of the needle, and the volume of a suction chamber.

Since the initial change of the injection rate is evaluated through incorporating the effect of the nozzle hole flow rate Qff of the injector, the seat diameter Dns of the needle, and the volume of the suction chamber, the injection rate change during the second lift-up period Tqr2 can be evaluated with high accuracy.

In a fuel injection system according to another aspect of the present invention, the required injection amount Q is represented by a fourth order equation with respect to the injection period upon determining the geometric shape of injection rate through approximating the injection rate change during the second lift-up period Tqr2 by use of the quadratic equation (the quadratic equation for evaluating the second lift-up waveform), and the injection period is determined from the required injection amount Q through a convergent computation.

Since the computation for solving the fourth order equation is replaced by the convergent computation, the computational load on the control device can be reduced.

In a fuel injection system according to another aspect of the present invention, the injection rate is assumed to increase at a constant speed during the third lift-up period Tqr3, and the injection rate change during the third lift-up period Tqr3 is evaluated through approximating the injection rate change by a linear equation (a linear equation for evaluating a third lift-up waveform).

Since the injection rate change during the third lift-up period Tqr3 is evaluated by use of the linear equation (the linear equation for evaluating the third lift-up waveform), the computational load on the control device can be reduced. In addition, the man-hour for adaptation associated with a change in the specifications of the injector can be reduced.

In a fuel injection system according to another aspect of the present invention, the linear equation for evaluating the injection rate change in the third lift-up period Tqr3 (the linear equation for evaluating the third lift-up waveform) is an equation in which the needle is assumed to move up at a constant speed while the pressure in the control chamber and the pressure in the nozzle chamber are balanced.

The computational load on the control device can be reduced through assuming the needle moves up at a constant speed while the pressure in the control chamber and the pressure in the nozzle chamber are balanced. In addition, the man-hour for adaptation associated with a change in the specifications of the injector can be reduced.

In a fuel injection system according to another aspect of the present invention, the linear equation for evaluating the injection rate change in the third lift-up period Tqr3 (the linear equation for evaluating the third lift-up waveform) is an equation in which the volume of the control chamber is assumed to be reduced by the difference between the inflow to the control chamber and the outflow from the control chamber while the pressure in the control chamber is held constant.

The computational load on the control device can be reduced through assuming the volume of the control chamber is reduced by the difference between the inflow to the control chamber and the outflow from the control chamber. In addition, the man-hour for adaptation associated with a change in the specifications of the injector can be reduced.

In a fuel injection system according to another aspect of the present invention, the pressure of the nozzle chamber in the linear equation (the linear equation for evaluating the third lift-up waveform) employs the nozzle hole flow rate Qff of the injector as a parameter for computation.

As the nozzle hole flow rate Qff increases, a drop of the injection pressure (the pressure in the nozzle chamber) becomes larger, resulting in a decrease of the increasing speed of the injection rate. Therefore, this decrease of the increasing speed of the injection rate can be incorporated into the linear equation (the linear equation for evaluating the third lift-up waveform), and the geometric shape of injection rate can be determined with high accuracy.

In a fuel injection system according to another aspect of the present invention, the control device divides the injection termination delay period Tde of the injector from when the driving signal is terminated to when the injection from the injector is completed into a first delay period Tde1' from when the driving signal is terminated to when the valve of the electric valve starts moving for valve closing, a second delay period Tde1" from when the valve of the electric valve starts moving for valve closing to when the needle starts moving down after the pressure in the control chamber reaches the valve closing pressure, and a third delay period Tde2 from when the needle starts moving down after the pressure in the control chamber reaches the valve closing pressure to when the needle stops moving down and the injection is terminated, and evaluates each of the first, second, and third delay periods Tde1', 1", and 2 by use of a simple physical equation.

Since the necessary response period of each part is individually evaluated through modeling each of the first, second, and third delay periods Tde1', 1", and 2 by use of a simple physical equation, the data size in the control device can be reduced. In addition, the computational load on the control device can be reduced.

When a part of the specifications of the injector is modified, it is sufficient that only the adaptation parameter of the modified part is changed. Therefore, the adaptation process associated with a change in the specifications of the injector can be facilitated.

In a fuel injection system according to another aspect of the present invention, the fixed value Tde1 (the lift-down delay period) is employed as the first and second delay periods Tde1' and 1".

The first delay period Tde1' is basically an electrical delay in the period from when the driving signal is terminated to when the valve of the electric valve starts the closing operation upon turning off the electric valve. This is independent of a fuel supply pressure Pc and is constant for injectors having the same specifications. Therefore, the first delay period Tde1' can be employed as a constant.

The second delay period Tde1" is the period related to the pressure drop in the control chamber. However, if a constant value is employed as the second delay period Tde1", the computational accuracy is not largely affected.

Therefore, if the fixed value Tde1 is employed as the first and second delay periods Tde1' and 1", the computational accuracy is not largely affected.

In this manner, the computational load on the control device can be reduced through employing a fixed value Tde1 as the first and second delay periods Tde1' and 1". In addition, the man-hour for adaptation associated with a change in the specifications of the injector can be reduced.

In a fuel injection system according to another aspect of the present invention, upon determining the geometric shape of injection rate having an area corresponding to the required injection amount Q, the control device evaluates the injection rate change during the third delay period Tde2, from when the needle starts moving down to when the needle stops moving down and the injection is terminated, through approximating the injection rate change by a linear equation representing the constant decrease in the injection rate (a linear equation for evaluating the lift-down waveform).

Since the injection rate change in the third delay period Tde2 is evaluated by use of the linear equation (the linear equation for evaluating the lift-down waveform), the computational load on the control device can be reduced. In addition, the man-hour for adaptation associated with a change in the specifications of the injector can be reduced.

In a fuel injection system according to another aspect of the present invention, the linear equation for evaluating the injection rate change in the third delay period Tde2 (the linear equation for evaluating the lift-down waveform) is an equation in which the needle is assumed to move down at a constant speed while the pressure in the control chamber and the pressure in the nozzle chamber are balanced.

The computational load on the control device can be reduced through assuming the needle moves down at a constant speed while the pressure in the control chamber and the pressure in the nozzle chamber are balanced. In addition, the man-hour for adaptation associated with a change in the specifications of the injector can be reduced.

In a fuel injection system according to another aspect of the present invention, the linear equation for evaluating the injection rate change in the third delay period Tde2 (the linear equation for evaluating the lift-down waveform) is an equation in which the volume of the control chamber is assumed to be increased by the difference between the inflow to the control chamber and the outflow from the control chamber while the pressure in the control chamber is held constant.

The computational load on the control device can be reduced through assuming the volume of the control chamber is increased by the difference between the inflow to the control chamber and the outflow from the control chamber while the pressure in the control chamber is held constant. In addition, the man-hour for adaptation associated with a change in the specifications of the injector can be reduced.

In a fuel injection system according to another aspect of the present invention, the pressure of the nozzle chamber in the linear equation (the linear equation for evaluating the lift-down waveform) employs the nozzle hole flow rate Qff of the injector as a parameter for computation.

As the nozzle hole flow rate Qff increases, a drop of the injection pressure (the pressure in the nozzle chamber) becomes larger, resulting in an increase in the lift-down speed of the needle. Therefore, this increase in the lift-down speed of the needle can be incorporated into the linear equation (the linear equation for evaluating the lift-down waveform).

In a fuel injection system according to another aspect of the present invention, the fuel supply pressure of the second and subsequent stages in multiple injections in which the fuel injection is divided into a plurality of stages employs a value evaluated through subtracting for each injection a pressure drop caused by the last injection from a base value which is an input value of the fuel supply pressure sensor at the starting timing of the fuel injection of the first stage.

In the second and subsequent stages in the multiple injections, a sensing error is generated in the input value of the fuel supply pressure sensor due to a pressure pulsation. However, the fuel supply pressure can be estimated through subtracting a pressure drop of the last injection. Therefore, the fuel supply pressure can be evaluated with high accuracy and a small error, and the geometric shape of injection rate can be determined with high accuracy.

In a fuel injection system according to another aspect of the present invention, the effect of a pulsation occurring on the fuel supply pressure in the second and subsequent stages is evaluated by use of a pulsation starting point obtained through shifting the end point of the last injection by a predetermined phase θ.

In this manner, the fuel supply pressure can be evaluated with high accuracy. As a result, the geometric shape of injection rate can be determined with high accuracy.

In a fuel injection system according to another aspect of the present invention, the pulsation starting point of the first stage is also taken into account upon evaluating the effect of the pulsation occurring on the fuel supply pressure in the third and subsequent stages.

In this manner, the fuel supply pressure can be evaluated with high accuracy. As a result, the geometric shape of injection rate can be determined with high accuracy.

Other features and advantages of the present invention will be appreciated, as well as methods of operation and the function of the related parts from a study of the following detailed description, appended claims, and drawings, all of which form a part of this application. In the drawings:

BRIEF DESCRIPTION OF THE DRAWINGS

FIG. 9A is a time chart illustrating one cycle of a multistage injection including a plurality of injections according to a conventional embodiment of a fuel injection device; and FIG. 9B is a detailed view of a single injection of the cycle of the multistage injection according to the conventional embodiment of the fuel injection device of FIG. 9A.

DETAILED DESCRIPTION OF THE PREFERRED EMBODIMENTS

Figure 1:
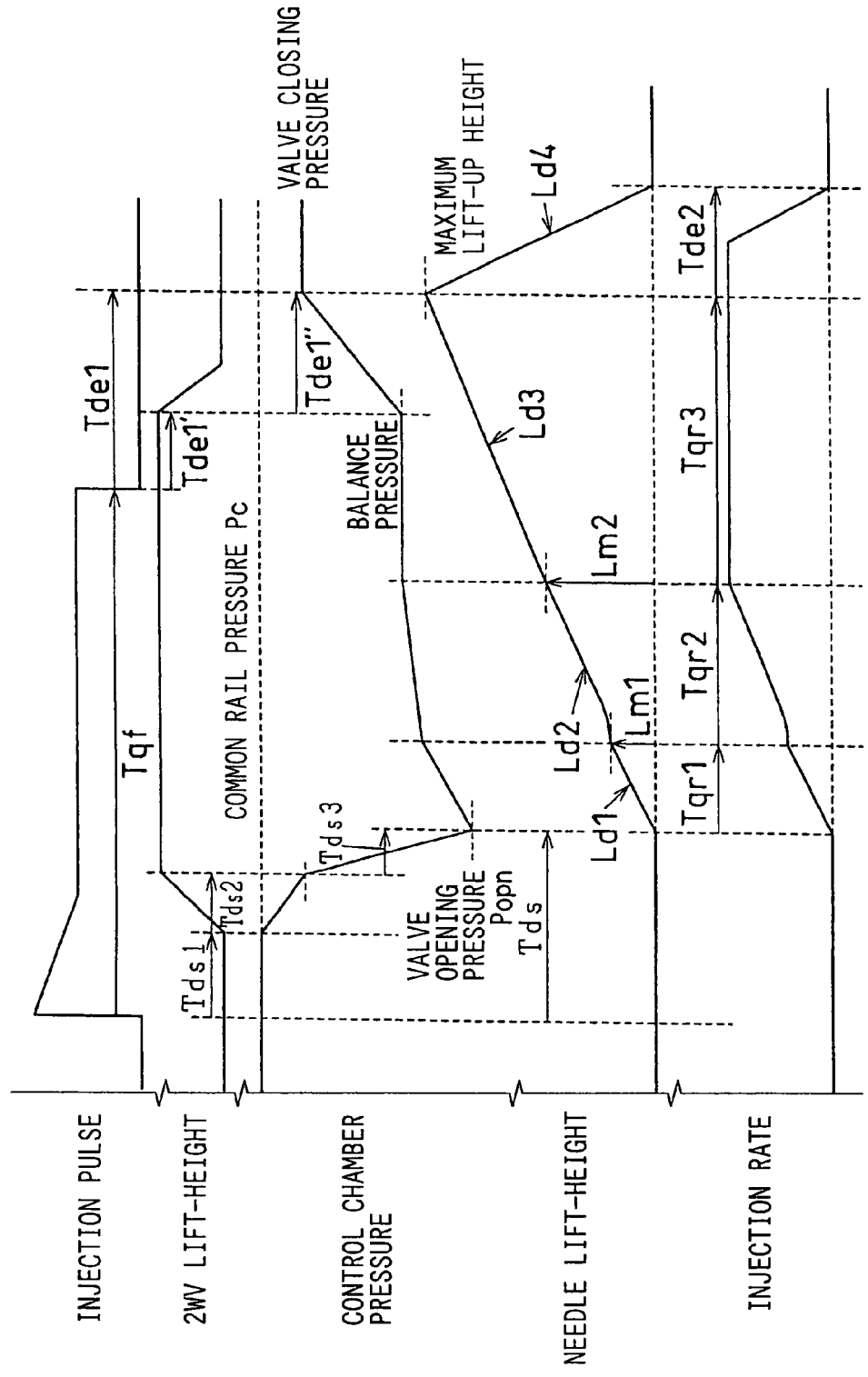
FIG. 1 is a time chart illustrating a driving pulse, a valve lift-height, a control chamber pressure, a needle lift-height change, and an injection rate change according to one embodiment of the present invention.

The control device of the fuel injection system according to an embodiment of the present invention comprises injection model evaluation means for determining "a geometric shape of lift-height having an area directly or indirectly corresponding to a required injection amount Q" which is employed for evaluating "an injector driving period Tqf from injector driving signal generation timing to driving signal termination timing" or "the driving signal termination timing after the driving signal generation." Upon determining the geometric shape of lift-height, the control device divides the lift-height change of a needle in the period from when the needle starts moving up to when the needle starts moving down into the lift-height change of the needle in a first rift-up period Tqr1 just after when the needle starts moving up, the lift-height change of the needle in a second lift-up period Tqr2 from the end of the first lift-up period Tqr1 to when the pressure in a control chamber becomes almost constant, and the lift-height change of the needle in a third lift-up period Tqr3 from the end of the second lift-up period Tqr2 to when the needle starts moving down, and evaluates the lift-height change of the needle in each of the needle of the first, second, and third lift-up periods Tqr1, 2, and 3 by use of a physical equation.

The control device of the fuel injection system of best mode 2 comprises injection model evaluation means for determining "the geometric shape of lift-height having an area directly or indirectly corresponding to the required injection amount Q" which is employed for evaluating "the injector driving period Tqf from the injector driving signal generation timing to the driving signal termination timimg" or "the driving signal termination timing after the driving signal generation." The control device divides an injection termination delay period Tde from when the driving signal of the injector is terminated to when the injection from the injector is completed into a first delay period Tde1' from when the driving signal is terminated to when the valve of an electric valve starts moving for valve closing, a second delay period Tde1" from when the valve of the electric valve starts moving for valve closing to when the needle starts moving down after the pressure in the control chamber reaches the valve closing pressure, and a third delay period Tde2 from when the needle starts moving down after the pressure in the control chamber reaches the valve closing pressure to when the needle stops moving down and the injection is terminated, and evaluates each of the first, second, and third delay periods Tde1', 1", and 2 by use of a simple physical equation.

The control device of the fuel injection system of best mode 3 comprises injection model evaluation means for determining "the geometric shape of lift-height having an area directly or indirectly corresponding to the required injection amount Q" which is employed for evaluating "the injector driving period Tqf from the injector driving signal generation timing to the driving signal termination timing" or "the driving signal termination timing after the driving signal generation." Upon determining the geometric shape of lift-height, the control device evaluates the lift-height change of the needle during the third delay period Tde2, from when the needle starts moving down to when the needle stops moving down and the injection is terminated, through approximating the lift-height change of the needle by a linear equation for evaluating a lift-down waveform.

The control device of the fuel injection system of best mode 4 comprises injection model evaluation means for determining "the geometric shape of injection rate having an area corresponding to the required injection amount Q" which is employed for evaluating "the injector driving period Tqf from the injector driving signal generation timing to the driving signal termination timing" or "the driving signal termination timing after the driving signal generation." Upon determining a geometric shape of injection rate, the control device divides the injection rate change in the period from when the needle starts moving up to when the needle starts moving down into the injection rate change in the first lift-up period Tqr1 just after when the needle starts moving up, the injection rate change in the second lift-up period Tqr2 from the end of the first lift-up period Tqr1 to when the pressure in a control chamber becomes almost constant, and the injection rate change in the third lift-up period Tqr3 from the end of the second lift-up period Tqr2 to when the needle starts moving down, and estimates each of the injection rate change in the first, second, and third lift-up periods Tqr1, 2, and 3 by use of a physical equation.

The control device of the fuel injection system of best mode 5 comprises injection model evaluation means for determining "the geometric shape of injection rate having an area corresponding to the required injection amount Q" which is employed for evaluating "the injector driving period Tqf from the injector driving signal generation timing to the driving signal termination timing" or "the driving signal termination timing after the driving signal generation." The control device divides the injection termination delay period Tde from when the driving signal is terminated to when the injection from the injector is completed into the first delay period Tde1' from when the driving signal is terminated to when the valve of the electric valve starts moving for valve closing, the second delay period Tde1" from when the valve of the electric valve starts moving for valve closing to when the needle starts moving down after the pressure in the control chamber reaches the valve closing pressure, and the third delay period Tde2 from when the needle starts moving down after the pressure in the control chamber reaches the valve closing pressure to when the needle stops moving down and the injection is terminated, and evaluates each of the first, second, and third delay periods Tde1', 1", and 2 by use of a simple physical equation.

The control device of the fuel injection system of best mode 6 comprises injection model evaluation means for determining "the geometric shape of injection rate having an area corresponding to the required injection amount Q" which is employed for evaluating "the injector driving period Tqf from the injector driving signal generation timing to the driving signal termination timing" or "the driving signal termination timing after the driving signal generation." Upon determining the geometric shape of injection rate, the control device evaluates the injection rate change during the third delay period Tde2, from when the needle starts moving down to when the needle stops moving down and the injection is terminated, through approximating the injection rate change by a linear equation for evaluating the lift-down waveform.

A first embodiment, in which the present invention is applied to a common rail type fuel injection system, will be described with reference to FIGS. 1 to 8.

Figure 2:
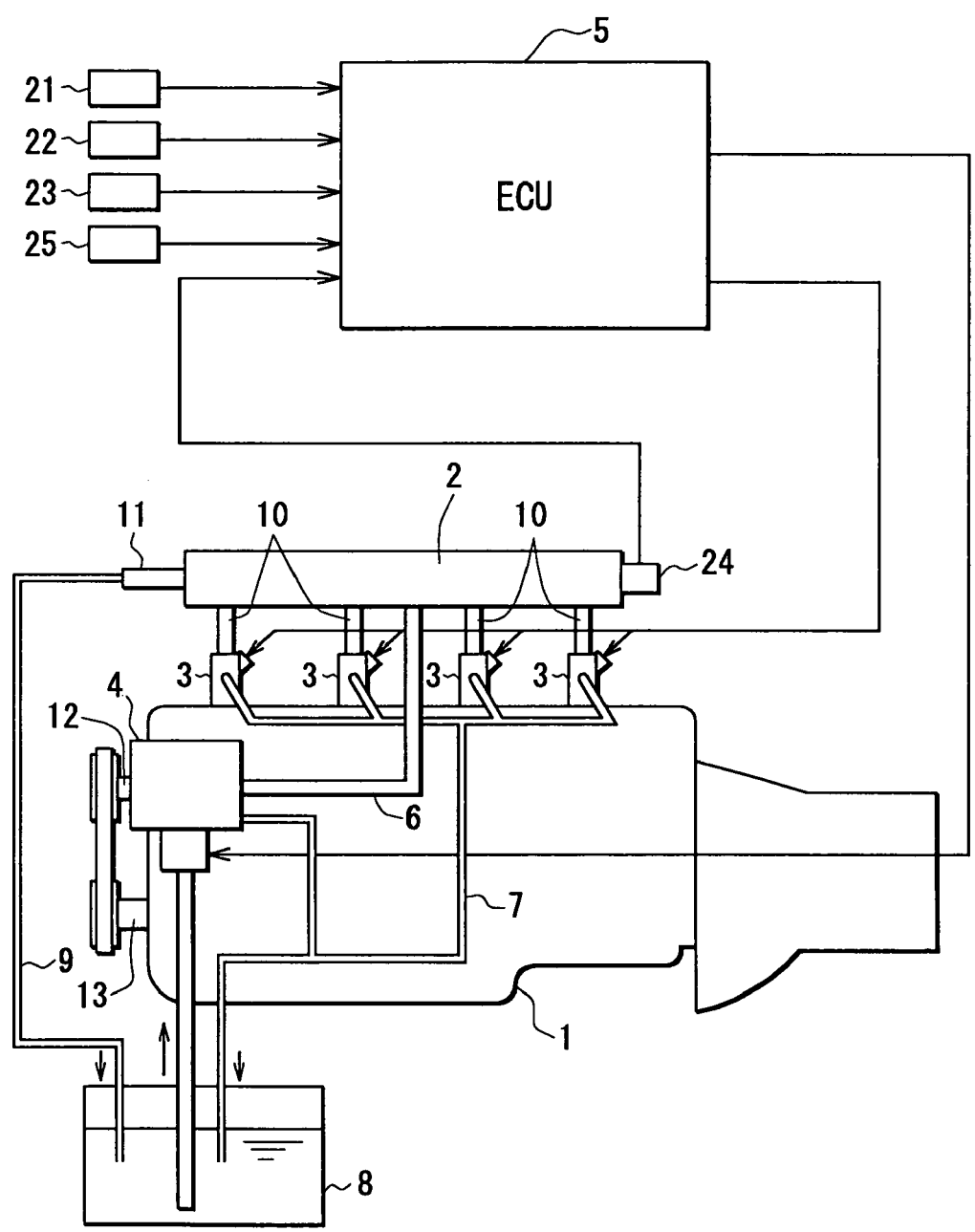
FIG. 2 is a schematic diagram of a common rail type fuel injection system according to one embodiment of the present invention.

The configuration of the common rail type fuel injection system will be explained with reference to FIG. 2.

The common rail type fuel injection system is a system which injects fuel into, for example, a diesel engine 1 (hereinafter referred to as an engine), and comprises a common rail 2, injectors 3, a supply pump 4, an ECU 5 (an engine control unit: corresponding to a control device), and the like.

The engine 1 comprises a plurality of cylinders which perform intake, compression, explosion, and exhaust strokes continuously. A four cylinder engine is illustrated in FIG. 2 as an example, but the engine may comprise any other number of cylinders.

The common rail 2 is a pressure accumulation vessel accumulating high-pressure fuel which is to be supplied to the injectors 3, and is connected to a discharge port of the supply pump 4 which supplies the high-pressure fuel via a fuel pipe 6 (a high-pressure fuel passage), such that a common rail pressure Pc having a high pressure value (corresponding to a fuel supply pressure for the injectors 3) is accumulated in the common rail 2.

The fuel leaked from the injectors 3 is returned to a fuel tank 8 via a leak pipe (a fuel return passage) 7.

A pressure limiter 11 is attached to a relief pipe (a fuel return passage) 9 which connects the common rail 2 and the fuel tank 8. The pressure limiter 11 serves as a pressure relief valve and opens when the fuel pressure in the common rail 2 exceeds a predetermined limit pressure, and thus the fuel pressure in the common rail 2 is maintained below the predetermined limit pressure.

Each of the injectors 3 is mounted in each of the cylinders of the engine 1 and injects fuel into the cylinder. A plurality of high-pressure fuel pipes 10 are branched from the common rail 2, and the injectors 3 are connected to the downstream end of the high-pressure fuel pipes 10 so as to inject the high-pressure fuel accumulated in the common rail 2 into each of the cylinders. The detailed description of the injectors 3 will be given later.

The supply pump 4 serves as a fuel pump which supplies the high-pressure fuel to the common rail 2, and includes a feed pump which draws the fuel contained in the fuel tank 8 to the supply pump 4 and a high-pressure pump which pressurizes the fuel drawn by the feed pump to high pressure and supplies the pressurized fuel to the common rail 2. The feed pump and the high-pressure pump are driven by a common camshaft 12. The camshaft 12 is driven and rotated by a crankshaft 13 or the like of the engine 1.

In addition, a pump control valve (not shown) which controls the amount of the fuel drawn by the high-pressure pump is attached to the supply pump 4. The pump control valve is controlled by the ECU 5 to adjust the common rail pressure Pc.

The ECU 5 comprises a well-known microcomputer having a configuration including a CPU which performs control and computation processes, a memory device (memory such as ROM, standby RAM, EEPROM, and RAM) which stores various programs and data, an input circuit, an output circuit, a power source circuit, an injector driving circuit, a pump driving circuit, and the like. The ECU 5 performs various computation processes based on signals (engine parameters, signals according to an operation state of an operator, an operation state of the engine 1, and the like) sent from sensors to the ECU 5.

Examples of the sensors connected to the ECU 5 include an accelerator sensor 21 for sensing an accelerator opening, a rotation speed sensor 22 for sensing an engine rotation speed, a cooling water temperature sensor 23 for sensing a temperature of cooling water of the engine 1, a common rail pressure sensor 24 (corresponding to a fuel supply pressure sensor) for sensing the common rail pressure Pc, and other sensors 25.

Figure 3:
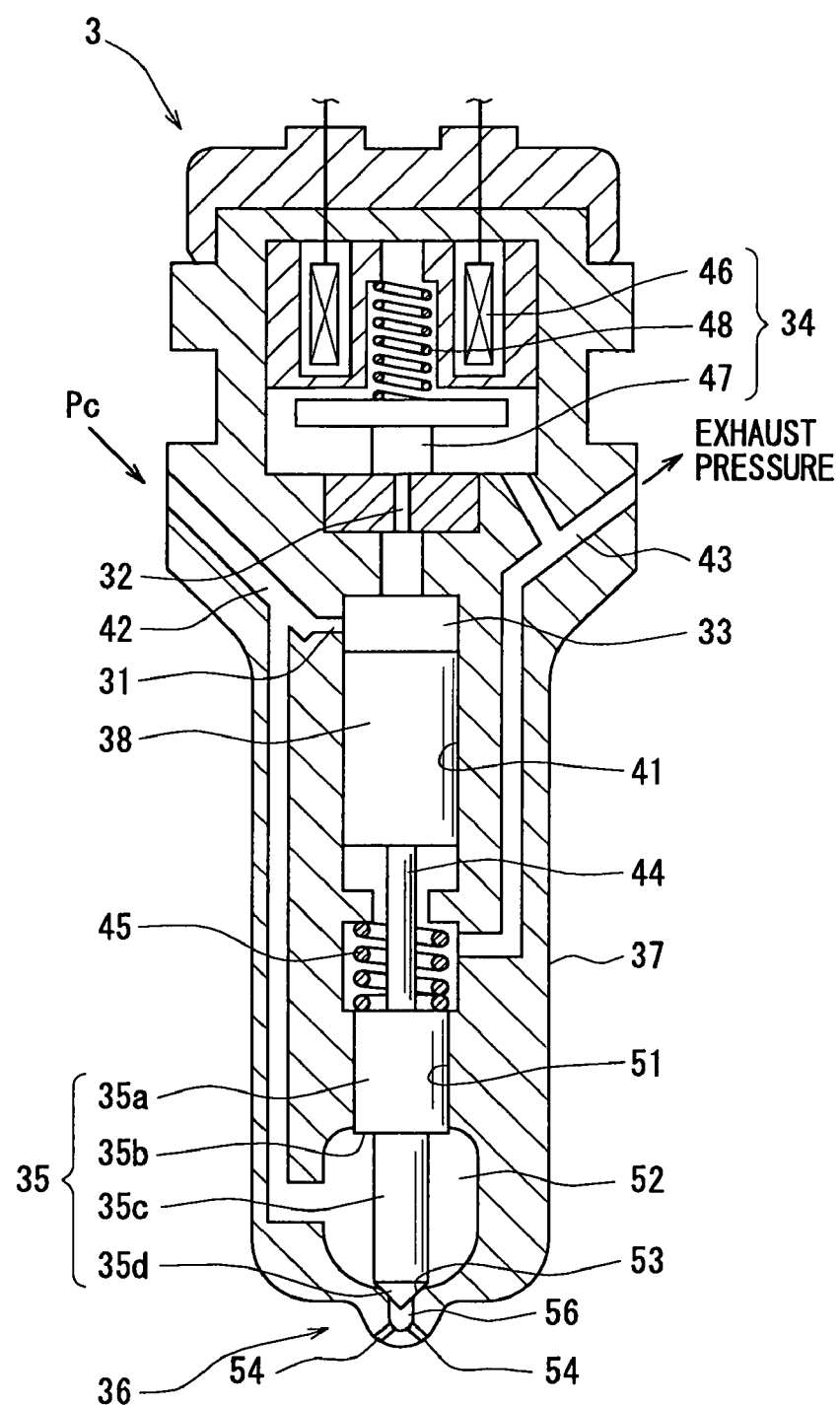
FIG. 3 is a schematic cross-section of an injector according to one embodiment of the present invention.

Next, the basic configuration of the injector 3 will be explained with reference to FIGS. 3 and 4.

The injector 3 injects the high-pressure fuel supplied from the common rail 2 into the cylinder of the engine 1, and comprises a nozzle 36 and a control chamber 33 to which the common rail pressure Pc is applied through an inflow passage 31 (a fuel passage having an in-orifice) and from which the pressure is exhausted through an exhaust passage 32 (a fuel passage having an out-orifice). The exhaust passage 32 is opened and closed by an electromagnetic valve 34 (an example of an electric valve), and when a control chamber pressure (the pressure inside the control chamber 33) Pcc drops to a valve opening pressure Popn, a needle 35 moves up to inject the fuel from the nozzle 36.

In a housing 37 (e.g., a nozzle holder) of the injector 3, a cylinder 41 which slidably supports a command piston 38 in the vertical direction (the opening and closing direction of the needle 35), a high-pressure fuel passage 42 for leading the high-pressure fuel supplied from the common rail 2 to the nozzle 36 side and the inflow passage 31 side, an exhaust pressure fuel passage 43 for exhausting the high-pressure fuel to a low pressure side, and the like are formed.

The command piston 38 is inserted into the cylinder 41 and is connected to the needle 35 through a pressure pin 44.

The pressure pin 44 is disposed between the command piston 38 and the needle 35, and a spring 45 is arranged around the pressure pin 44 to spring-bias the needle 35 downward (the valve closing direction).

The control chamber 33 is formed on the upper side of the cylinder 41 (the electromagnetic valve 34 side), and the volume of the control chamber 33 changes with the vertical motion of the command piston 38.

The inflow passage 31 serves as a fuel throttle of the inlet side for reducing the pressure of the high-pressure fuel supplied from the high-pressure fuel passage 42, and the high-pressure fuel passage 42 and the control chamber 33 are communicated through the inflow passage 31.

The exhaust passage 32 is formed on the upper side of the control chamber 33 and serves as a fuel throttle of the outlet side for throttling the fuel exhausted from the control chamber 33 to the exhaust pressure fuel passage 43 (the low pressure side). The control chamber 33 and the exhaust pressure fuel passage 43 are communicated through the exhaust passage 32.

The electromagnetic valve 34 comprises a solenoid 46 which generates an electromagnetic force when a current is applied (ON), a valve 47 which is drawn upward (the valve opening direction) through the electromagnetic force generated by the solenoid 46, and a return spring 48 which spring-biases the valve 47 downward (the valve closing direction).

For example, the valve 47 includes a ball valve 47a (see FIG. 4) which opens and closes the exhaust passage 32. When the solenoid 46 is in the OFF state, the valve 47 is pressed downward by the spring-biasing force of the return spring 48 to seal the exhaust passage 32 by the ball valve 47a. When the solenoid 46 is in the ON state, the valve 47 moves upward against the spring-biasing force of the return spring 48. Therefore, the ball valve 47a is lifted upward from a seating plane to open the exhaust passage 32.

In a housing 37 (e.g., a nozzle body) of the injector 3, a slide hole 51 which slidably supports the needle 35 in the vertical direction (the opening and closing direction), a nozzle chamber 52 which is communicated with the high-pressure fuel passage 42 and is circularly provided around the outer periphery of the needle 35, a conical valve seat 53 on which the needle 35 is seated when the valve is closed, and a plurality of nozzle holes 54 for injecting the high-pressure fuel are formed. The nozzle holes 54 are drilled within the seat diameter Dns of a sealing seat 55 (see FIG. 4) at which the needle 35 and the valve seat 53 are abutted when the needle 35 is seated.

The needle 35 comprises a sliding shaft 35a which is held by the sliding hole 51, a pressure sensing surface 35b formed in the lower side of the sliding shaft 35a, a small diameter shaft 35c extending downward from the pressure sensing surface 35b, and a conical valve 35d which opens and closes the nozzle holes 54 through lifted from or seating on the valve seat 53. The sliding shaft 35a is reciprocally movable in the shaft direction while sealing between the nozzle chamber 5z and a low pressure side (around the pressure pin 44).

The conical valve 35d on the tip of the needle 35 includes an upper truncated cone and a lower conical tip, and the sealing seat 55 is formed in the boundary therebetween. The spread angle of the truncated cone is smaller than the spread angle of the valve seat 53, and the spread angle of the conical tip is larger than the spread angle of the valve seat 53.

When the conical valve 35d is seated on the valve seat 53, the sealing seat 55 of the conical valve 35d is abutted on the valve seat 53 to block the communication between the nozzle chamber 52 and the nozzle holes 54.

The basic operation principle of the injector 3 will next be described with reference to FIGS. 5 and 6.

When a driving pulse is sent to the electromagnetic valve 34 from the ECU 5 (driving signal generation), the solenoid 46 attracts the valve 47. When the valve 47 starts moving up (2WV lift-height in FIGS. 5 and 6), the exhaust passage 32 is opened, and the pressure in the control chamber 33 which has been reduced in the inflow passage 31 starts decreasing.

When the pressure in the control chamber 33 becomes the valve opening pressure Popn or lower, the needle 35 starts moving up. When the needle 35 is lifted from the valve seat 53, the nozzle chamber 52 and the nozzle holes 54 are communicated to inject the high-pressure fuel supplied into the nozzle chamber 52 from the nozzle holes 54. The time period from when the driving signal is generated to when the injection is started is referred to as an injection starting delay period Tds, and the details for evaluating the injection starting delay period Tds will be given later.

As the needle 35 moves up, an injection rate increases. A change in the lift-height of the needle 35 is referred to as a lift-up height change Lup, and the details for evaluating the lift-up height change Lup will be given later. An increase in the injection rate is referred to as an injection rate increase Qup. When the injection rate increase Qup reaches the maximum injection rate Qmax, the injection rate does not increase beyond the maximum injection rate Qmax (see FIG. 6).

The injector 3 is a flying needle type in which the needle 35 continues moving up even after the injection rate increase Qup reaches the maximum injection rate Qmax.

When the driving pulse which has been applied to the electromagnetic valve 34 from the ECU 5 is terminated (driving signal termination), the solenoid 46 stops attracting the valve 47 and the valve 47 starts moving down. When the exhaust passage 32 is sealed by the valve 47 of the electromagnetic valve 34, the pressure in the control chamber 33 starts increasing. When the pressure in the control chamber 33 becomes the valve opening pressure or higher, the needle 35 starts moving down. (The time period from when the driving signal is terminated to when the needle 35 starts moving down is referred to as a lift-down delay period Tde1, and the time period from when the needle 35 starts moving up to when the needle 35 starts moving down is referred to as a needle lift-up period Tqr. A decrease in the injection rate while the needle 35 is moving down is referred to as an injection rate decrease Qdn.)

When the needle 35 moves down and is seated on the valve seat 53, the communication between the nozzle chamber 52 and the nozzle holes 54 is blocked to stop the fuel injection from the nozzle holes 54. (A change in the lift-height of the needle when the needle 35 is moving down height is referred to as a lift-down height change Ldn. The time period from when the needle 35 starts moving down to when the injection is terminated is referred to as a third delay period Tde2, and the time period from when the driving signal is terminated to when the injection is terminated is referred to as an injection termination delay period Tde.)

Next, fuel injection control by the ECU 5 will be described.

In the first embodiment, a plurality of fuel injections (multiple injections) are performed in one cycle for preventing engine vibration and engine noise, for cleaning exhaust gases, for achieving high engine power and good fuel consumption simultaneously to a high degree. At each fuel injection, the ECU 5 determines required injection timing and a required injection amount Q in accordance with the current operation conditions by use of a program such as a map stored in ROM and engine parameters sent to RAM. The ECU 5 sends a driving signal (e.g., a driving pulse) to the injector 3 such that a fuel injection is started from the injector 3 at the required injection timing and the required injection amount Q is injected from the injector 3.

The ECU 5 of this first embodiment comprises: (A) driving signal generation timing evaluation means for evaluating "driving signal generation timing (driving pulse turning ON timing)" to start the fuel injection from the injector 3 at the required injection timing; and (B) driving signal termination timing evaluation means for evaluating "an injector driving period Tqf from the driving signal generation timing to the driving signal termination timing" or "the driving signal termination timing (driving pulse turning OFF timing) after the driving signal generation" so as to obtain the required injection amount Q.

The driving signal termination timing evaluation means is a program for determining "a geometric shape of lift-height having an area direly or indirectly corresponding to the required injection amount Q" and then evaluating the driving signal termination timing by use of the geometric shape of lift-height. The details of the driving signal generation timing evaluation means and the driving signal termination timing evaluation means will be given later.

The driving signal generation timing evaluation means will now be described.

The ECU 5 determines the driving signal generation timing through shifting backward the required injection timing a1 (the starting point of the formation of the geometric shape of lift-height or the geometric shape of injection rate (to be described later); the required injection timing a1 is evaluated in accordance with the operation conditions) by the injection starting delay period Tds. That is, the driving signal generation timing is determined by a1−Tds.

Therefore, since the driving signal generation timing is determined through shifting backward the timing when the injector 3 actually starts fuel injection by the injection starting delay period Tds, the injection can be started at the required injection timing determined by the ECU 5.

Next, an evaluation technique of the injection starting delay period Tds will be described.

The driving signal generation timing evaluation means determines "the injection starting delay period Tds" defined as the period from when a valve opening instruction is given to the injector 3 (the driving signal is generated) to when the injector 3 actually starts the fuel injection. The program for determining the injection starting delay period Tds divides the injection starting delay period Tds into first, second, and third injection starting delay periods Tds1, 2, and 3 and then evaluating each of the first, second, and third injection starting delay periods Tds1, 2, and 3 by use of a simple physical equation. The injection starting delay period Tds is determined by adding the evaluated first, second, and third injection starting delay periods Tds1, 2, and 3.

The first injection starting delay period Tds1 is a required period from when a current is applied to the electromagnetic valve 34 (the driving signal is generated) to when the valve 47 of the electromagnetic valve 34 starts moving for valve opening (moving up).

The second injection starting delay period Tds2 is a required period from when the valve 47 starts moving for valve opening (moving up) to when the valve 47 reaches the final opening position (the moving-up of the valve 47 is completed).

The third injection starting delay period Tds3 is a required period from when the valve 47 reaches the final opening position to when the control chamber pressure Pcc is lowered to the valve opening pressure Popn.

Figure 4:
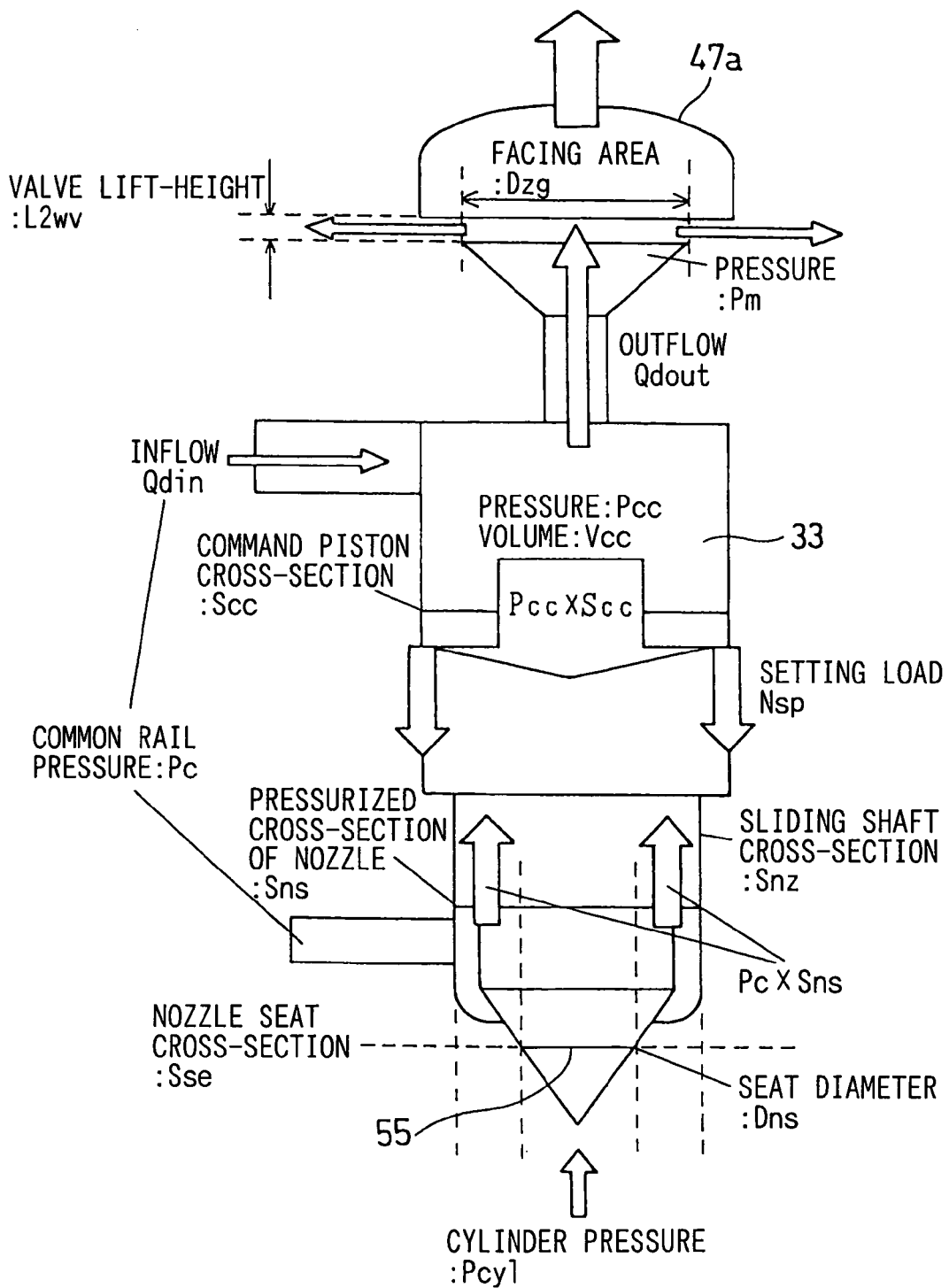
FIG. 4 is an explanatory drawing illustrating a simplified model of an injector according to one embodiment of the present invention.

FIG. 4 shows a simplified model of the structure of the injector 3, and a method for estimating the required operation period (the first, second, and third injection starting delay periods Tds1, 2, and 3) of each part of the simplified model of the injector 3 will be described. For evaluating the first, second, and third injection starting delay periods Tds1, 2, and 3, values for computation (substituting values) of each part of the model of the injector 3 shown in FIG. 4 will be described.

Common rail pressure: Pc
Control chamber pressure: Pcc
Control chamber volume: Vcc
Inflow of the fuel to the control chamber 33 via the inflow passage 31: Qdin
Outflow of the fuel from the control chamber 33 via the exhaust passage 32: Qdout
Area to which the exhaust pressure from the exhaust passage 32 to the ball valve 47*a* is applied (facing area): Dzg
Pressure applied from the exhaust passage 32 to the ball valve 47*a*: Pm
Lift-height from the seating state of the valve 47 to the maximum lift-height: L2wv
Load applied to the command piston 38 by the fuel pressure in the control chamber 33: Pcc×cross-sectional area of the command piston Scc
Setting load applied to the needle 35 through the spring 45: Nsp
Pressurized cross-section of the nozzle: Sns=sliding shaft cross-section Snz−nozzle seat cross-section Sse
Nozzle seat cross-section: Sse=π×(seat diameter Dns/2)$^2$
Load applied to the needle 35 by the fuel pressure in the nozzle chamber 52 (an upper-seat counterforce for pressing back the needle 35 to the valve opening side): Pc×Sns
Cylinder pressure (pressure applied from outside to the nozzle hole 54 side of the sealing seat 55): Pcyl
Load applied to the needle 35 from outside through the nozzle holes 54 (lower-seat counterforce): Pcyl×Sse
Nozzle counterforce: Pc×Sns+Pcyl×Sse In the following calculation, the pressure Pm=0 is employed and also the facing area Dzg is not employed. However, the pressure Pm and the facing area Dzg may be employed for improving the computational accuracy of the injection starting delay period Tds (particularly, of the third injection starting delay period Tds3).

In the first embodiment, the control chamber pressure Pcc when the valve 47 reaches the final valve opening position is determined by use of the common rail pressure Pc, which is applied to the injector 3, multiplied by a coefficient in which the effect of pulsation is taken into account. In this manner, the pressure drop of the control chamber pressure Pcc when the valve 47 reaches the final valve opening position can be taken into account, and thus the computational accuracy of the injection starting delay period Tds can be improved (particularly, of the third injection starting delay period Tds3).

The nozzle counterforce is determined through separately evaluating the upper-seat counterforce for pressing back the needle 35 to the valve opening side by the common rail pressure Pc applied to the needle 35 and the lower-seat counterforce applied to the nozzle hole 54 side of the sealing seat 55 of the needle 35 from outside through the nozzle holes 54.

Thus, the computation for evaluating the nozzle counterforce can be simplified through dividing the nozzle counterforce into the upper-seat counterforce and the lower-seat counterforce.

Upon determining the upper-seat counterforce, the common rail pressure Pc in which the effect of pulsation is taken into account is employed.

When the lower-seat counterforce is determined, the cylinder pressure Pcyl in the cylinder having the injector 3 from which the fuel is to be injected is estimated, and the estimated cylinder pressure Pcyl is employed. The cylinder pressure Pcyl is determined based on the crank angle counted by the rotation speed sensor 22 and the injection timing of the injector 3. When the cylinder pressure Pcyl is increased due to the combustion of the last fuel injection, the cylinder pressure Pcyl is estimated based on the crank angle and the injection timing of the injector 3 as well as the last injection amount.

The nozzle counterforce can be determined by use of a sliding friction coefficient between the command piston 38 and the needle 35 as an offset value for improving the computational accuracy of the nozzle counterforce. In addition, the computational accuracy of the nozzle counterforce can be improved through taking into account the self weight (when mounted on a vehicle) of the command piston 38 and the needle 35 and employing the self weight as an offset value for the nozzle counterforce computation.

The first injection starting delay period Tds1 will now be evaluated.

The first injection starting delay period Tds1 is a constant depending on the specifications of the injector 3.

The first injection starting delay period Tds1 is basically an electrical delay in the period from the driving signal generation timing to when the valve 47 of the electromagnetic valve 34 starts the opening operation upon turning on the electromagnetic valve 34. This is independent of the common rail pressure Pc and is constant for the given specifications of the injector 3. Therefore, the first injection starting delay period Tds1 can be employed as a constant.

As described above, the data amount and the computational load on the ECU 5 can be reduced through employing the first injection starting delay period Tds1 as a constant. In addition, the man-hour for adaptation associated with a change in the specifications of the injector 3 can be reduced.

The first injection starting delay period Tds1 can be determined by use of an equation in which the estimated control chamber pressure Pcc, the outlet diameter (the facing area Dzg) of the exhaust passage 32, a force pressurizing the ball valve 47a in the valve opening direction through pressure Pm, and a voltage value (e.g., a charge voltage value) applied to the electromagnetic valve 34 are employed as a parameter.

In this manner, each of the parameters can be appropriately incorporated into in the first injection starting delay period Tds1, and thus the computational accuracy of the injection starting delay period Tds can be improved. In addition, the man-hour for adaptation associated with a change in the specifications of the injector 3 can be reduced.

The second injection starting delay period Tds2 will now be evaluated.

The second injection starting delay period Tds2 is the period from when the valve 47 starts moving up to when the valve 47 reaches the maximum lift-height (or the valve 47 reaches the lift-height L2wv). The second injection starting delay period Tds2 becomes shorter as the common rail pressure Pc increases. Thus, the second injection starting delay period Tds2 can be determined by assuming that the second injection starting delay period Tds2 is inversely proportional to the square root of the common rail pressure Pc.

Specifically, as an example, the second injection starting delay period Tds2 can be determined from the following equation:

$$Tds2 = \sqrt{(2 \times L2wv/K \times Pc)} \qquad \text{Equation 1}$$

K in Equation 1 is a coefficient determined by experiments or the like.

In this manner, the common rail pressure Pc can be appropriately incorporated into the second injection starting delay period Tds2, and the computational accuracy of the injection starting delay period Tds can be improved. In addition, the man-hour for adaptation associated with a change in the specifications of the injector 3 can be reduced.

The period from when the valve 47 of the electromagnetic valve 34 starts the opening operation (moving up) to when the valve 47 is fully opened (the second injection starting delay period Tds2) becomes shorter as the control chamber pressure Pcc increases. Thus, the second injection starting delay period Tds2 can be determined by assuming that the second injection starting delay period Tds2 is inversely proportional to the square root of the estimated control chamber pressure Pcc.

In this manner, the control chamber pressure Pcc can be appropriately incorporated into the second injection starting delay period Tds2, and the computational accuracy of the injection starting delay period Tds can be improved. In addition, the man-hour for adaptation associated with a change in the specifications of the injector 3 can be reduced.

The third injection starting delay period Tds3 will now be evaluated.

The third injection starting delay period Tds3 is the period from when the valve 47 of the electromagnet valve 34 reaches the final opening position to when the injector 3 starts the fuel injection, and a pressure change Pccdot of the control chamber pressure Pcc is represented by the following equation:

$$Pccdot = (Ke/Vcc) \times (Qdin - Qdout) \qquad \text{Equation 2}$$

Here, Ke is bulk modulus obtained by experiments or the like.

A control chamber inflow Qdin and a control chamber outflow Qdout can be determined by the following equations:

$$Qdin = Qdin0 \times \sqrt{(Pc - Pcc)} \qquad \text{Equation 3}$$

$$Qdout = Qdout0 \times \sqrt{(Pcc - Pm)} \qquad \text{Equation 4}$$

The third injection starting delay period Tds3 can be evaluated through substituting Equations 3 and 4 into Equation 2, and then integrating the pressure change Pccdot from the common rail pressure Pc to the valve opening pressure Popn.

However, since the computational load of the above described integration is very large, the implementation of the above described integration process on the ECU 5 actually equipped in a vehicle is difficult in view of the processing load of the software.

Figure 7:
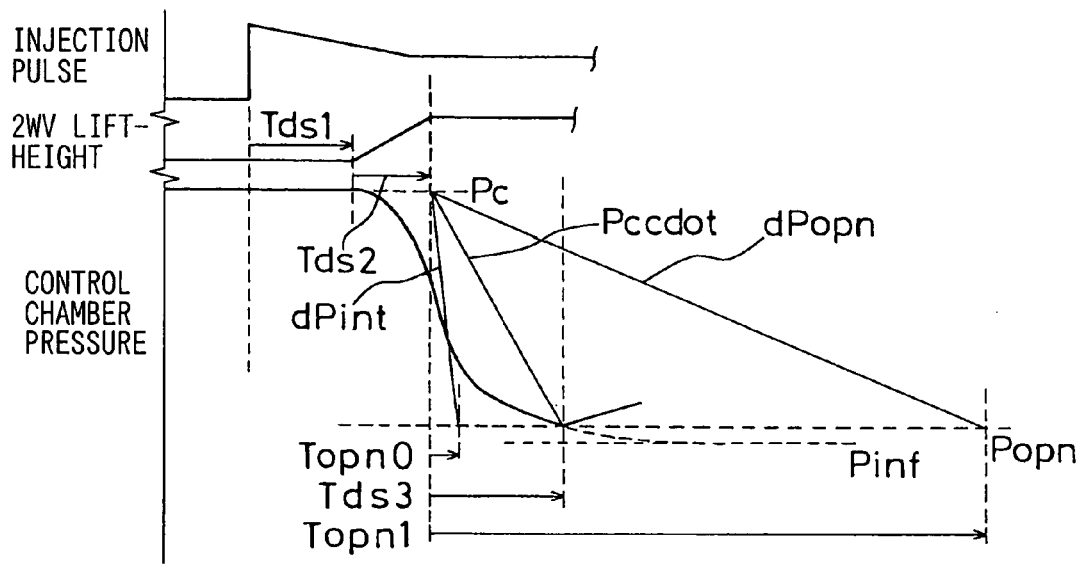
FIG. 7 is a time chart illustrating a pressure change in a control chamber in an injection starting delay period according to one embodiment of the present invention.

Therefore, the third injection starting delay period Tds3 is evaluated from an internal division equation by use of an initial pressure change rate dPint of the control chamber pressure Pcc at the timing when the valve 47 reaches the final valve opening position and a valve opening pressure change rate dPopn of the control chamber pressure Pcc at the timing when the control chamber pressure Pcc reaches the valve opening pressure Popn, as shown in FIG. 7.

Since the inflow Qdin=0 when the valve 47 starts moving up, the initial pressure change rate dPint is represented by the following equation by use of Equation 2:

$$dPint=-(Ke/Vcc)\times Qdout0\times\sqrt{Pc} \qquad \text{Equation 5}$$

Also, the valve opening pressure change rate dPopn is represented by the following equation:

$$dPopn=(Ke/Vcc)\times(Qdin\times\sqrt{(Pc-Popn)}-Qdout\times\sqrt{Popn}) \qquad \text{Equation 6}$$

In Equations 5 and 6, the pressure Pm=0 is employed for simplifying the computation. For the actual phenomenon, the computation should be performed by use of the control chamber pressure Pcc after the valve 47 is fully opened. However, the control chamber pressure Pcc is assumed to be changed from the initial pressure (the common rail pressure Pc) for simplifying the computation. The initial pressure change rate dPint and the valve opening pressure change rate dPopn can be determined by use of the pressure Pm and the control chamber pressure Pcc after the valve 47 is fully opened.

In this manner, through evaluating the third injection starting delay period Tds3 from the internal division equation by use of the initial pressure change rate dPint and the valve opening pressure change rate dPopn, the third injection starting delay period Tds3 can be determined without performing the integration process in real-time. Since, the processing load for evaluating the third injection starting delay period Tds3 is significantly reduced, and the third injection starting delay period Tds3 can be determined by means of the ECU 5 actually equipped in a vehicle.

A shortest reaching period Topn0 is the period during which the control chamber pressure Pcc changes from the initial pressure (the common rail pressure Pc) to the valve opening pressure Popn while the pressure change rate is held constant at the initial pressure change rate dPint, and is represented by the following equation:

$$Topn0=(Popn-Pc)/dPint \qquad \text{Equation 7}$$

A longest reaching period Topn1 is the period during which the control chamber pressure Pcc changes from the initial pressure (the common rail pressure Pc) to the valve opening pressure Popn while the pressure change rate is held constant at the valve opening pressure change rate dPopn, and is represented by the following equation:

$$Topn1=(Popn-Pc)/dPopn \qquad \text{Equation 8}$$

The third injection starting delay period Tds3 always exists between the shortest reaching period Topn0 and the longest reaching period Topn1, as shown in FIG. 7. Therefore, if an internal division ratio Kip of the shortest reaching period Topn0 to the longest reaching period Topn1 is known, the third injection starting delay period Tds3 can be determined.

Assuming that the third injection starting delay period Tds3=a control chamber pressure decreasing period Topn, the control chamber pressure decreasing period Topn is represented by the following equation:

$$Topn=(1-Kip)\times Topn0+Kip\times Topn1 \qquad \text{Equation 9}$$

A method for evaluating the internal division ratio Kip will next be described.

When the valve 47 of the electromagnetic valve 34 starts moving up, the control chamber pressure Pcc decreases due to the fuel outflow from the control chamber 33. When the force pressing the command piston 38 and the needle 35 downward (the valve closing direction) and the force pressing the command piston 38 and the needle 35 upward (the valve opening direction) are balanced, the command piston 38 and the needle 35 start moving up. The control chamber pressure Pcc at this point is employed as the valve opening pressure Popn.

Next, the minimum value of the valve opening pressure Popn will be considered. The control chamber pressure Pcc decreases through fuel outflow via the exhaust passage 32, but this occurs only when the relation "outflow Qdout>inflow Qdin" holds. If the relation "outflow Qdout<inflow Qdin" holds and the command piston 38 remains at rest, the control chamber pressure Pcc increases since the control chamber volume Vcc is constant.

Therefore, the valve opening pressure Popn exists between the initial pressure (the common rail pressure Pc) and a balance pressure Pinf.

Assuming that the minimum value of the valve opening pressure Popn is the balance pressure Pinf, the following equation holds:

$$Qdin\times\sqrt{(Pc-Pinf)}=Qdout\times\sqrt{(Pinf-Pm)} \qquad \text{Equation 10}$$

The balance pressure Pinf can be determined by the following equation obtained through the use of Equation 10:

$$Pinf=(Pc\times Qdin^2)/(Qdin^2+Qdout^2) \qquad \text{Equation 11}$$

Also, the valve opening pressure Popn is represented by the static force balance condition between a nozzle pressing force, which presses the command piston 38 and the nozzle 36 to the valve closing side by the control chamber pressure Pcc and the setting load Nsp of the spring 45, and the nozzle counterforce, which presses the command piston 38 and the nozzle 36 to the valve opening side. Therefore the following relation holds.

$$Popn\times Scc+Nsp=Pc\times Sns+Pcyl\times Sse \qquad \text{Equation 12}$$

The valve opening pressure Popn can be determined by the following equation obtained through the use of Equation 12:

$$Popn=(Pc\times Sns+Pcyl\times Sse-Nsp)/Scc \qquad \text{Equation 13}$$

The valve opening pressure Popn is normalized for each pressure level based on the balance pressure Pinf, and the normalized pressure Pstd is represented by the following equation:

$$Pstd=(Popn-Pinf)/(Pc-Pint) \qquad \text{Equation 14}$$

Figure 8:
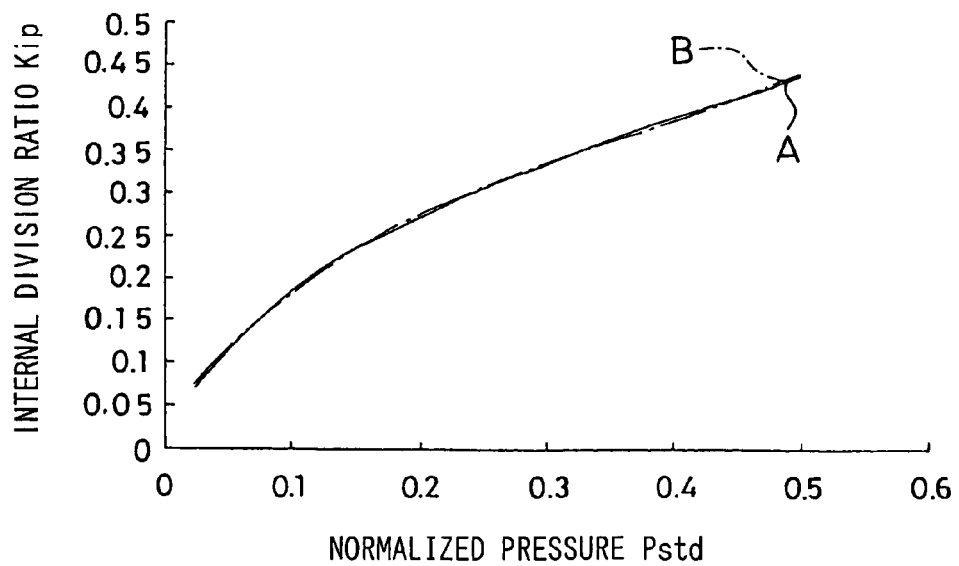
FIG. 8 is a characteristic diagram illustrating a relationship between a normalized pressure and an internal division ratio according to one embodiment of the present invention.

The relationship between the normalized pressure Pstd and the internal division ratio Kip is shown in FIG. 8.

The normalized pressure Pstd can be evaluated from Equations 11, 13, and 14. The internal division ratio Kip can be determined by use of the evaluated normalized pressure Pstd, and thus the control chamber pressure decreasing period Topn or the third injection starting delay period Tds3 can be evaluated from Equation 9.

The relationship of the internal division ratio Kip with respect to the normalized pressure Pstd can be stored in the ECU 5 as a map, but the data amount in the ECU 5 becomes large. In this Embodiment, the relationship of the internal division ratio Kip with respect to the normalized pressure Pstd (a solid line A in FIG. 8) is represented by an approximate polynomial expression such as a cubic polynomial (an alternate short and dashed line B in FIG. 8), and the approximate expression is stored in the ECU 5 as data. In FIG. 8, the solid line A and the alternate short and dashed line B are almost indistinguishable since the approximation is very accurate.

As described above, in the first embodiment, the internal division ratio Kip is represented by an approximate polynomial expression, and this approximate polynomial expression is employed for evaluating the internal division ratio Kip at a given normalized pressure Pstd. Since a polynomial expression is employed, the approximation accuracy of the internal division ratio Kip can be improved. In addition, the internal division ratio Kip is determined from the approximate polynomial expression, the size of data to be written in the memory device of the ECU 5 can be reduced compared with the case where the internal division ratio Kip is stored as a map.

A correction procedure for the third injection starting delay period Tds3 determined above will next be described.

Upon determining the third injection starting delay period Tds3, if the valve 47 reached the valve opening position during the present injection within a predetermined time period after the valve 47 reached the valve closing position during the last injection, the ECU 5 performs a command piston expansion-contraction correction procedure in which the third injection starting delay period Tds3 is shortened. The larger the shortened amount, the closer the timing when the valve 47 reached the valve opening position during the present injection is to the timing when the valve 47 reached the valve closing position during the last injection.

The fluctuation of the third injection starting delay period Tds3 due to the expansion-contraction of the command piston 38 (the expansion of the command piston 38 due to the pressure drop in the control chamber 33 during the last injection, and the contraction of the command piston 38 by the high-pressure fuel supplied in the control chamber 33 after the injection) can be suppressed through the command piston expansion-contraction correction, and thus the computational accuracy of the third injection starting delay period Tds3 can be improved.

As described above, the ECU 5 determines the injection starting delay period Tds for each injection through adding the first, second, and third injection starting delay periods Tds1, 2, and 3. Since the required response period of each part is individually determined through modeling the response of each part during the first, second, and third injection starting delay periods Tds1, 2, and 3 by use of a simple expression or the like, a huge size of data for adaptation conventionally employed is not required upon evaluating the injection starting delay period Tds.

In this manner, the size of the data to be written in the memory device of the ECU 5 can be reduced. Even when a part of the specifications of the injector 3 is modified, it is sufficient that only the adaptation parameter of the modified part is changed. Therefore, the adaptation process associated with a change in the specifications of the injector 3 can be facilitated.

The driving signal termination timing evaluation means will now be described as a feature of the first embodiment.

The ECU 5 performs model injection control. In the model injection control, the geometric shape of lift-height having an area directly or indirectly corresponding to the required injection amount Q is determined (a function of injection model evaluation means), and the injector driving period Tqf (or a driving signal termination timing) from the driving signal generation timing to the driving signal termination timing is determined by use of the determined geometric shape of lift-height.

The model injection control will next be described.

In order to evaluate the driving signal termination timing for correctly injecting the required injection amount Q from the injector 3, the ECU 5 determines the geometric shape of lift-height (the geometric shape defined by the time axis and the lift-height waveform of the needle 35) having an area corresponding to the required injection amount Q (a value corresponding to the area of the geometric shape of injection rate), and then evaluates the driving signal termination timing based on the determined geometric shape of lift-height. The geometric shape of lift-height is drawn based on the common rail pressure Pc applied to the injector 3 and the specification requirement of the injector 3.

Specifically, in this Embodiment, the driving signal termination timing is evaluated through evaluating the injector driving period Tqf from the driving signal generation timing to the driving signal termination timing.

A procedure for evaluating the injector driving period Tqf includes the following steps: (1) determining the lift-height waveform of the needle 35; (2) evaluating the area of the geometric shape of lift-height; and (3) evaluating the injector driving period Tqf from the relationship between the target injection amount Q and the geometric shape of lift-height.

The evaluation of "the area of the geometric shape of lift-height" in (2) will next be described.

The relationship between "the geometric shape of injection rate" and "the geometric shape of lift-height" will be described.

Figure 5:
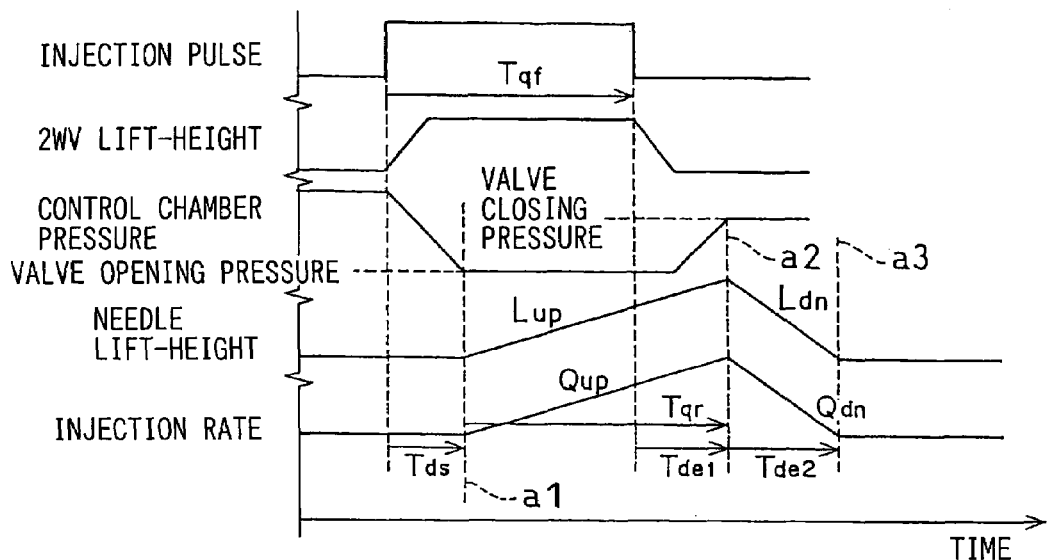
FIG. 5 is a time chart illustrating a relationship between a driving pulse and an actual injection in a small injection according to one embodiment of the present invention.

As described in the operation of the injector 3, if the injection rate increase Qup dose not reach the maximum injection rate Qmax (e.g., a small injection), a geometric shape of injection rate having a nearly triangular shape (not exactly a triangle) is drawn by the time axis and the injection rates (the injection rate increase Qup and the injection rate decrease Qdn), as shown in FIG. 5.

At the same time, a geometric shape of lift-height having a nearly triangular shape (not exactly a triangle) is drawn by the time axis and the lift-heights (the lift-up height change Lup and the lift-down height change Ldn).

The geometric shape of lift-height has the same base side as the geometric shape of injection rate, but the height of the geometric shape of lift-height is different from the height of the geometric shape of injection rate.

Therefore, the relationship between them is such that the ratio between "the area of the geometric shape of lift-height" and "the area of the geometric shape of injection rate" is proportional to the ratio between their heights. Since "the area of the geometric shape of injection rate" corresponds to the injection amount, the injection amount is directly related to "the area of the geometric shape of lift-height."

Figure 6:
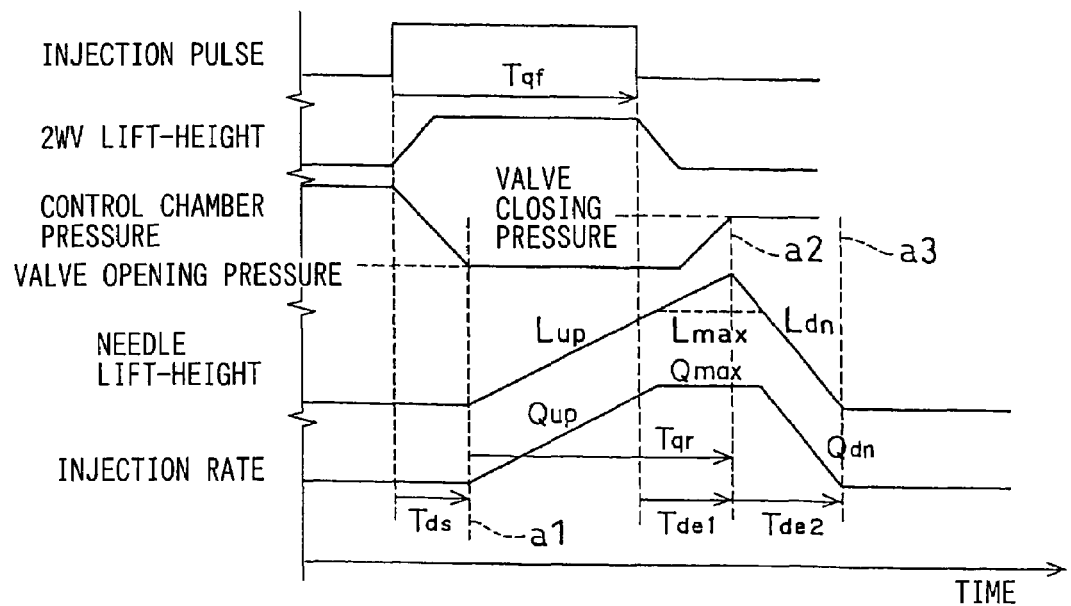
FIG. 6 is a time chart illustrating a relationship between a driving pulse and an actual injection in a large injection according to one embodiment of the present invention.

On the other hand, if the injection rate increase Qup reaches the maximum injection rate Qmax (e.g., a large injection), a geometric shape of injection rate having a nearly trapezoidal shape (not exactly a trapezoid) is drawn by the time axis and the injection rates (the injection rate increase Qup, the maximum injection rate Qmax, and the injection rate decrease Qdn), as shown in FIG. 6.

At the same time, a geometric shape of lift-height having a nearly triangular shape (not exactly a triangle) is drawn by the time axis and the lift-heights (the lift-up height change Lup and the lift-down height change Ldn). Since the maximum injection rate Qmax is determined by a nozzle hole flow rate, the lift-height of the needle 35 at which the maximum injection rate Qmax is achieved is determined by the specifications of the injector 3, and thus the lift-height of the needle 35 at which the maximum injection rate Qmax is achieved can be estimated in advance. Therefore, assuming that the lift-height of the needle 35 at which the maximum injection rate Qmax is achieved is given at an estimated maximum injection rate lift-height Lmax, "a geometric shape of virtual lift-height" having a nearly trapezoidal shape (not exactly a trapezoid) is drawn by the time axis, "the lift-up height change Lup, the estimated maximum injection rate lift-height Lmax and the lift-down height change Ldn."

The geometric shape of virtual lift-height has the same base and top sides as the geometric shape of injection rate, but the height of the geometric shape of virtual lift-height is different from the height of the geometric shape of injection rate.

Therefore, the relationship between them is such that the ratio between "the area of the geometric shape of virtual lift-height" and "the area of the geometric shape of injection rate" is proportional to the ratio between their heights. The geometric shape of virtual lift-height is formed by use of "the geometric shape of lift-height" and "the estimated maximum injection rate lift-height Lmax." Since "the area of the geometric shape of injection rate" corresponds to the injection amount, the injection amount is indirectly related to "the area of the geometric shape of lift-height."

An example for evaluating "the injector driving period Tqf" in (3) mentioned above will next be described.

As described above, if the injection rate dose not reach the maximum injection rate Qmax, the area of the geometric shape of lift-height is directly proportional to the injection amount. Thus, the geometric shape of lift-height having an area proportional to the required injection amount Q in a predetermined ratio is determined, and the driving signal termination timing is determined through subtracting the lift-down delay period Tde1 from the timing at which the needle 35 starts moving down (the termination timing of the needle lift-up period Tqr: the maximum lift-up height).

If the injection rate reaches the maximum injection rate Qmax, the area of the geometric shape of virtual lift-height determined by use of the estimated maximum injection rate lift-height Lmax is proportional to the injection amount. Thus, the geometric shape of virtual lift-height having an area proportional to the required injection amount Q in a predetermined ratio is determined, and the driving signal termination timing is determined through subtracting the lift-down delay period Tde1 from the timing at which the needle 35 starts moving down (the termination timing of the needle lift-up period Tqr) in the actual geometric shape of lift-height.

That is, the injector driving period Tqf is evaluated through adding the needle lift-up period Tqr to the injection starting delay period Tds and then subtracting the lift-down delay period Tde1 (Tqf=Tds+Tqr−Tde1).

In this manner, through evaluating the driving signal termination timing (or the injector driving period Tqf), the required injection amount Q determined by the ECU 5 can be correctly injected from the injector 3.

In The first embodiment, the driving signal termination timing is determined by use of the injector driving period Tqf. However, the driving signal termination timing can be determined through shifting backward, by the lift-down delay period Tde1, the timing a2 at which the pressure in the control chamber 33 reaches the valve opening pressure. That is, the driving signal termination timing can be given by a2−Tde1.

Also, the driving signal termination timing can be determined through shifting backward, by the lift-down delay period Tde1 and the third delay period Tde2, the timing a3 at which the formation of the geometric shape of injection rate is completed with respect to the time axis. That is, the driving signal termination timing can be given by a3−Tde1−Tde2.

An example for evaluating "a lift-height waveform of the needle 35" in (1) mentioned above will next be described.

The lift-height waveform of the needle 35 is drawn by the lift-up height change Lup and the lift-down height change Ldn.

An example for evaluating the lift-up height change Lup will now be described.

The lift-up height change Lup is a change in the lift-height of the needle 35 from when the needle 35 starts moving up to when the needle 35 starts moving down. As shown in FIG. 1, the needle lift-up period Tqr is divided into a first lift-up period Tqr1 (an initial lift-up period) just after when the needle 35 starts moving up, a second lift-up period Tqr2 (a secondary lift-up period) from the end of the first lift-up period Tqr1 to when the pressure in the control chamber 33 becomes almost constant, and a third lift-up period Tqr3 (a constant lift-up period) from the end of the second lift-up period Tqr2 to when the needle 35 starts moving down. The lift-heights of the needle 35 during each of the first, second, and third lift-up periods Tqr1, 2, and 3 is evaluated by use of a predetermined physical equation to draw the lift-up height change Lup (the waveform of a change of the lift-height while the needle 35 is moving up).

An example for evaluating the lift-height waveform of the needle 35 during the first lift-up period Tqr1 will now be described.

The first lift-up period Tqr1 starts just after the needle 35 is lifted from the valve seat 53. Assuming that the needle 35 moves up at a constant speed during the first lift-up period Tqr1, the lift-height change of the needle 35 during the first lift-up period Tqr1 is evaluated through approximating the lift-height change by a linear equation for evaluating the first lift-up waveform by use of the lift-up speed Ld1 (the initial lift-up speed) of the needle 35.

Since the lift-height change (the lift-height waveform) of the needle 35 during the first lift-up period Tqr1 is evaluated by use of the linear equation for evaluating the first lift-up waveform as described above, the computational load on the ECU 5 can be reduced. In addition, the man-hour for adaptation associated with a change in the specifications of the injector 3 can be reduced.

The linear equation for evaluating the first lift-up waveform, which evaluates the lift-up speed Ld1 of the needle 35, employs a nozzle hole flow rate Qff and the seat diameter Dns of the needle 35 as a parameter for computation.

As a specific example, the lift-up speed Ld1 of the needle 35 during the first lift-up period Tqr1 can be computed from the following equation:

$$Ld1 = K1 \times Dns \times \{1 - (K2 \times Qff)/Q0\} \qquad \text{Equation 15}$$

K1 and K2 in Equation 15 are coefficients determined by experiments or the like. As mentioned above, Dns is the seat diameter, and Qff is an injection amount (a nozzle hole flow rate) from the nozzle hole 54 of the injector 3. Q0 is a reference nozzle hole flow rate.

As the nozzle hole flow rate Qff increases, a decrease of the injection pressure (the pressure in the nozzle chamber 52) becomes larger, resulting in a decrease of the lift-up speed Ld1 of the needle 35. Therefore, this decrease of the lift-up speed Ld1 of the needle 35 can be incorporated into the linear equation for evaluating the first lift-up waveform. In addition, as the seat diameter Dns increases, the upward force on the needle 35 just after the needle 35 starts moving up (just after the valve opening) increases, resulting in an increase in the lift-up speed Ld1 of the needle 35. Therefore, this increase in the lift-up speed Ld1 of the needle 35 can also be incorporated into the linear equation for evaluating the first lift-up waveform. Thus, the lift-height waveform of the needle 35 can be determined with high accuracy.

In the coefficient K1 in Equation 15, the effect of the piping pulsation generated in the high pressure fuel piping (the common rail 2, the high-pressure fuel pipes 10, and the fuel passages in the injector 3) supplying the high-pressure fuel to the injector 3 is taken into account.

Since the effect of the piping pulsation can be incorporated into the upward force applied to the seat diameter Dns, the lift-height change of the needle 35 during the first lift-up period Tqr1 can be evaluated with high accuracy.

Also in the coefficient K1 in Equation 15, the effect of the control chamber pulsation generated in the control chamber 33 is taken into account.

Since the effect of the control camber pulsation can be incorporated into the upward force applied to the seat diameter Dns, the lift-height change of the needle 35 during the first lift-up period Tqr1 can be evaluated with high accuracy.

An example for evaluating the lift-height waveform of the needle 35 during the third lift-up period Tqr3 will now be described.

Assuming that the needle 35 moves up at a constant speed under a constant injection pressure (a nozzle chamber pressure) during the third lift-up period Tqr3, the lift-height change of the needle 35 during the third lift-up period Tqr3 is evaluated through approximating the lift-height of the needle 35 by a linear equation for evaluating the third lift-up waveform by use of the lift-up speed Ld3 (the constant lift-up speed) of the needle 35.

Since the lift-height change (the lift-height waveform) of the needle 35 during the third lift-up period tqr3 is evaluated by use of the linear equation for evaluating the third lift-up waveform, the computational load on the ECU 5 can be reduced. In addition, the man-hour for adaptation associated with a change in the specifications of the injector 3 can be reduced.

In the linear equation for evaluating the third lift-up waveform, the needle 35 is assumed to move up at a constant speed while the pressure in the control chamber 33 and the pressure in the nozzle chamber 52 are balanced. In addition, in the linear equation for evaluating the third lift-up waveform, the volume of the control chamber 33 is assumed to be reduced by the difference between the inflow to the control chamber 33 and the outflow from the control chamber 33 while the pressure in the control chamber 33 is held constant.

In this manner, the computational load on the ECU 5 can be reduced. In addition, the man-hour for adaptation associated with a change in the specifications of the injector 3 can be reduced.

The linear equation for evaluating the third lift-up waveform, which evaluates the lift-up speed Ld3 of the needle 35 as a pressure Pinj in the nozzle chamber 52, employs the nozzle hole flow rate Qff of the injector 3 as a parameter for computation.

As a specific example, the pressure Pinj of the nozzle chamber 52 during the third lift-up period Tqr3 can be evaluated from the following equation:

$$Pinj = Pc \times \{1 - (K \times Qff)/Q0\} \quad \text{Equation 16}$$

K in Equation 16 is a coefficient determined by experiments or the like. Qff is the nozzle hole flow rate of the injector 3, and Q0 is the reference nozzle hole flow rate.

As the nozzle hole flow rate Qff increases, a drop of the injection pressure (the pressure in the nozzle chamber 52) becomes larger, resulting in a decrease of the lift-up speed Ld3 of the needle 35. Therefore, this decrease of the lift-up speed Ld3 of the needle 35 can be incorporated into the linear equation for evaluating the third lift-up waveform. Thus, the lift-height waveform of the needle 35 can be evaluated with high accuracy.

An example for evaluating the lift-height waveform of the needle 35 during the second lift-up period Tqr2 will now be described.

The second lift-up period Tqr2 is the period from the end of the first lift-up period Tqr1 in which a constant lift-up speed is assumed to the beginning of the third lift-up period Tqr3 in which a constant lift-up speed is assumed. The lift-height waveform of the needle 35 in the second lift-up period Tqr2 has a shape close to a quadratic curve as shown in FIG. 1.

Therefore, assuming that the needle 35 moves up along a quadratic curve during the second lift-up period Tqr2, a lift-up speed Ld2 (a second lift-up speed) of the needle 35 during the second lift-up period Tqr2 is evaluated through approximating the lift-up speed Ld2 by a quadratic equation for evaluating the second lift-up waveform.

Since the lift-height change (the lift-height waveform) of the needle 35 during the second lift-up period Tqr2 is evaluated by use of the quadratic equation for evaluating the second lift-up waveform as described above, the computational load on the ECU 5 can be reduced. In addition, the man-hour for adaptation associated with a change in the specifications of the injector 3 can be reduced.

The coefficients in the quadratic equation for evaluating the second lift-up waveform are determined through solving simultaneous equations involving the gradients of the lift-up speeds Ld1 and Ld3 of the needle 35 at both the ends of the second lift-up period Tqr2, a lift-height Lm1 of the needle 35 at the end of the first lift-up period Tqr1, and a lift-height Lm2 at the end of the third lift-up period Tqr3.

The quadratic equation for evaluating the second lift-up waveform includes a correction coefficient for correcting an initial speed change of the needle 35 due to the pressure drop in the nozzle chamber 52.

Since the initial speed change of the needle 35 is evaluated by incorporating the pressure drop in the nozzle chamber 52, the lift-height change of the needle 35 during the second lift-up period Tqr2 can be evaluated with high accuracy.

The correction coefficient for correcting the initial speed change is evaluated by use of the nozzle hole flow rate Qff of the injector 3, the seat diameter Dns of the needle 35, and the volume of a suction chamber 56 of the injector 3.

Since the initial speed change of the needle 35 is evaluated by incorporating the nozzle hole flow rate Qff of the injector 3, the seat diameter Dns of the needle 35, and the volume of the suction chamber 56 of the injector 3, the lift-height change of the needle 35 during the second lift-up period Tqr2 can be evaluated with high accuracy. Therefore, the lift-height waveform of the needle 35 can be determined with high accuracy.

As described above, the lift-up height change Lup (the waveform of the lift-height change while the needle 35 is moving up) can be determined through evaluating the lift-height change in each of the first, second, and third lift-up period Tqr1, 2, and 3.

An example for evaluating the lift-down height change Ldn will now be described.

The lift-down height change Ldn is a change in the lift-height of the needle 35 from when the needle 35 starts moving down to when the needle 35 is seated on the valve seat 53. The lift-height change of the needle 35 during this period (the third delay period Tde2: the lift-down period) is evaluated by use of a predetermined physical equation to draw the lift-down height change Ldn (the waveform of the lift-height change while the needle 35 is moving down).

In this Embodiment, the injection termination delay period Tde from when the driving signal is terminated to when the injection from the injector 3 is completed is divided into a first delay period Tde1' from when the driving signal is terminated to when the valve 47 of the electromagnetic valve 34 starts moving for valve closing, a second delay period Tde1" from when the valve 47 of the electromagnetic valve 34 starts moving for valve closing to when the needle 35 starts moving down after the pressure in the control chamber 33 reaches the valve closing pressure, and a third delay period Tde2 from when the needle 35 starts moving down after the pressure in the control chamber 33 reaches the valve closing pressure to when the needle 35 stops moving down and the injection is terminated. The description of each period will next be given.

Assuming that the needle 35 moves down at a constant speed under a constant injection pressure (the nozzle chamber pressure) during the third delay period Tde2 as in the above described third lift-up period Tqr3, the needle waveform in the third delay period Tde2 is evaluated through approximating the lift-height change of the needle 35 during the third delay period Tde2 by a linear equation for evaluating the lift-down waveform by use of a lift-down speed Ld4 of the needle 35.

Since the lift-height change (the lift-height waveform) of the needle 35 during the third delay period Tde2 is evaluated by use of the linear equation for evaluating the lift-down waveform, the computational load on the ECU 5 can be reduced. In addition, the man-hour for adaptation associated with a change in the specifications of the injector 3 can be reduced.

In the linear equation for evaluating the lift-down waveform, the needle 35 is assumed to move down at a constant speed while the pressure in the control chamber 33 and the pressure in the nozzle chamber 52 are balanced. In addition, in the linear equation for evaluating the lift-down waveform, the volume of the control chamber 33 is assumed to be increased by the difference between the inflow to the control chamber 33 and the outflow from the control chamber 33 while the pressure in the control chamber 33 is held constant.

In this manner, the computational load on the ECU 5 can be reduced. In addition, the man-hour for adaptation associated with a change in the specifications of the injector 3 can be reduced.

The linear equation for evaluating the lift-down waveform, which evaluates the lift-down speed Ld4 of the needle 35 as the pressure Pinj in the nozzle chamber 52, employs the nozzle hole flow rate Qff on the injector 3 as a parameter for computation.

As a specific example, the pressure Pinj in the nozzle chamber 52 during the third lift-up period Tqr3 can be evaluated from the following equation:

$$Pinj = Pc \times \{1 - (K \times Qff)/Q0\} \qquad \text{Equation 17}$$

Equation 17 is the same as Equation 16 described above. K in Equation 17 is a coefficient determined by experiments or the like. Qff is the nozzle hole flow rate of the injector 3, and Q0 is the reference nozzle hole flow rate.

As the nozzle hole flow rate Qff increases, a drop of the injection pressure (the pressure in the nozzle chamber 52) becomes larger, resulting in an increase in the lift-down speed of the needle 35. Therefore, this increase in the lift-down speed of the needle 35 can be incorporated into the linear equation for evaluating the lift-down waveform. Thus, the lift-height waveform of the needle 35 can be evaluated with high accuracy.

The lift-up height change Lup and the lift-down height change Ldn can be drawn through performing the above described computations. Therefore, the lift-height waveform of the needle 35 from the valve opening to the valve closing of the injector 3 can be drawn, and the geometric shape of lift-height can be determined.

In this Embodiment, the geometric shape of lift-height is determined through approximating the lift-height waveform in the second lift-up period Tqr2 by the quadratic equation for evaluating the second lift-up waveform. Therefore, the required injection amount Q is represented by a fourth order equation with respect to an injection period (the period during which the injector 3 actually injects the fuel: a period for the lift-up height change Lup and the lift-down height change Ldn). However, in this embodiment, the injection period is determined from the required injection amount Q through employing a convergent computation instead of employing the fourth order equation.

Since the computation for solving the fourth order equation is replaced by the convergent computation, the computational load on the ECU 5 can be reduced.

As described above, in this Embodiment, the injection termination delay period Tde from when the driving signal is terminated to when the injection from the injector 3 is completed is divided into the first delay period Tde1' from when the driving signal is terminated to when the valve 47 of the electromagnetic valve 34 starts moving for valve closing, the second delay period Tde1" from when the valve 47 of the electromagnetic valve 34 starts moving for valve closing to when the needle 35 starts moving down after the pressure in the control chamber 33 reaches the valve closing pressure, and the third delay period Tde2 from when the needle 35 starts moving down after the pressure in the control chamber 33 reaches the valve closing pressure to when the needle 35 stops moving down and the injection is terminated.

Subsequently, each of the first, second, and third delay periods Tde1', 1", and 2 is evaluated by use of a simple physical equations. The third delay period Tde3 is determined through the use of the computation results of the lift-down height change Ldn described above.

Since the necessary response period of each part is individually evaluated through modeling each of the first, second, and third delay periods Tde1', 1", and 2 by use of a simple physical equation, the data size in the ECU 5 can be reduced. In addition, the computational load on the ECU 5 can be reduced.

Even when a part of the specifications of the injector 3 is modified, it is sufficient that only the adaptation parameter of the modified part is changed. Therefore, the adaptation process associated with a change in the specifications of the injector 3 can be facilitated.

In this embodiment, the fixed value Tde1 (the lift-down delay period) is employed as the first and second delay periods Tde1' and 1".

The first delay period Tde1' is basically an electrical delay in the period from when the driving signal is terminated to when the valve 47 of the electromagnetic valve 34 starts the closing operation upon turning off the electromagnetic valve. This is independent of the common rail pressure Pc and is constant for injectors having the same specifications. Therefore, the first delay period Tde1' can be employed as a constant.

On the other hand, the second delay period Tde1" is the period related to the pressure drop in the control chamber 33. However, if a constant value is employed as the second delay period Tde1", the computational accuracy is not largely affected.

Therefore, if the fixed value Tde1 (the lift-down delay period) is employed as the first and second delay periods Tde1' and 1", the computational accuracy is not largely affected.

The computational load on the ECU 5 can be reduced through employing the fixed value Tde1 (the lift-down delay period) as the first and second delay periods Tde1' and 1". In addition, the man-hour for adaptation associated with a change in the specifications of the injector 3 can be reduced.

When the common rail pressure Pc is employed in the each computation described above, a predicted pressure is evaluated through subtracting for each injection a pressure drop dP caused by the last injection from a base value which is an input value (the common rail pressure Pc) of the common rail pressure sensor 24 (the fuel supply pressure sensor) at the starting timing of the fuel injection in the first stage, and is employed as the common rail pressure Pc in the second and subsequent stages.

As a specific example, the pressure drop dP can be determined by the following equation:

$$dP = dQ/(V \times E) \qquad \text{Equation 18}$$

dQ in Equation 18 is the injection amount in the previous stage. V is the volume of a high pressure portion including the nozzle holes 54, and E is the elastic modulus of the volume.

In the second and subsequent stages in the multiple injections, a sensing error is generated in the input value of the common rail pressure sensor 24 due to a pressure pulsation. However, the common rail pressure Pc can be estimated through sequentially subtracting for each injection the pressure drop dP of the last injection from the common rail pressure Pc of the common rail pressure sensor 24 at the starting timing of the fuel injection in the first stage. Therefore, the common rail pressure Pc (the fuel supply pressure) applied to the injector 3 can be determined with high accuracy and a small error, and the geometric shape of lift-height can be determined with high accuracy.

When the effect of the pulsation on the common rail pressure Pc in the second and subsequent stages during the multiple injections is taken into account, the effect of pulsation is evaluated by use of a pulsation starting point obtained through shifting the end point of the last injection by a predetermined phase, in each computation described above. In the third and subsequent stages, the effect of the pulsation in the first injection is also taken into account in addition to the effect of the pulsation in the last injection.

In this manner, the common rail pressure Pc can be determined with high accuracy. As a result, the geometric shape of lift-height can be determined with high accuracy.

In the common rail type fuel injection system described in the first embodiment, when the geometric shape of lift-height is determined in the ECU 5, the lift-height change of the needle 35 in the period from when the needle 35 starts moving up to when the needle 35 starts moving down is divided into the lift-height change in the first lift-up period Tqr1 just after when the needle starts moving up, the lift-height change in the second lift-up period Tqr2 from the end of the first lift-up period Tqr1 to when the pressure in the control chamber 33 becomes almost constant, and the lift-height change in the third lift-up period Tqr3 from the end of the second lift-up period Tqr2 to when the needle 35 starts moving down, and the lift-height change in each of the first, second, and third lift-up periods Tqr1, 2, and 3 is evaluated by use of a linear or quadratic physical equation. Since the lift-height change (the lift-up height change Lup) of the needle 35 during the first, second, and third lift-up periods Tqr1, 2, and 3 is determined through modeling the lift-height change by use of a linear or quadratic physical equation which facilitates the computation, the lift-up height change Lup with high accuracy can be determined without placing a heavy computational load on the ECU 5.

In addition, the lift-height change (the lift-down height change Ldn) of the needle 35 in the period from when the needle 35 starts moving down to when the needle 35 is seated on the valve seat 53 is also determined through modeling the lift-height change by use of a linear physical equation. Therefore, the geometric shape of lift-height (a lift-height waveform of the needle 35) can be drawn with high accuracy. As a result, the injector driving period Tqf (or the driving signal termination timing) can be evaluated with high accuracy.

Upon evaluating the injector driving period Tqf (or the driving signal termination timing), a correction map conventionally employed for correcting a base driving period need not be provided. Therefore, if the number of injection stages in multiple injections is increased, the man-hour for adaptation can be reduced. In this manner, the injector driving period Tqf (or the driving signal termination timing) with high accuracy can be determined without placing an excessive computational load on the ECU 5.

In addition, when a part of the specifications of an injector 3 is modified, it is sufficient that only the adaptation parameter of the modified part is changed. Therefore, the adaptation process associated with a change in the specifications of the injector 3 can be facilitated.

In the first embodiment, the needle 35 is assumed to move up at a constant speed during the first lift-up period Tqr1, and the lift-height change of the needle 35 during the first lift-up period Tqr1 is evaluated through approximating the lift-height change by a linear equation for evaluating the first lift-up waveform. Therefore, the computational load on the ECU 5 can be reduced, and the man-hour for adaptation associated with a change in the specifications of the injector 3 can be reduced.

In the linear equation for evaluating the first lift-up waveform, the nozzle hole flow rate Qff of the injector 3 and the seat diameter Dns of the needle 35 are employed as a parameter for computation, as shown in Equation 15.

As the nozzle hole flow rate Qff increases, a drop of the injection pressure (the pressure in the nozzle chamber 52) becomes larger, resulting in a decrease of the lift-up speed Ld1 of the needle 35. Therefore, this decrease of the lift-up speed Ld1 of the needle 35 can be incorporated into the linear equation for evaluating the first lift-up waveform. In addition, as the seat diameter Dns increases, the upward force on the needle 35 just after the needle 35 starts moving up (just after the valve opening) increases, resulting in an increase in the lift-up speed Ld1 of the needle 35. Therefore, this increase in the lift-up speed Ld1 of the needle 35 can also be incorporated into the linear equation for evaluating the first lift-up waveform. As a result, the geometric shape of lift-height can be determined with high accuracy.

The coefficient K1 in Equation 15 is involved in the linear equation for evaluating the first lift-up waveform, and the effect of the piping pulsation generated in the high pressure fuel piping supplying the high-pressure fuel to the injector 3 is taken into account in the coefficient K1. Therefore, the lift-height change of the needle 35 in the first lift-up period Tqr1 can be estimated with high accuracy.

In addition, the coefficient K1 in Equation 15 is involved in the linear equation for evaluating the first lift-up waveform, and the effect of the control chamber pulsation generated in the control chamber 33 is taken into account in the coefficient K1. Therefore, the lift-height change of the needle 35 in the first lift-up period Tqr1 can be evaluated with high accuracy.

In the first embodiment, the needle 35 is assumed to move up along a quadratic curve during the second lift-up period Tqr2, and the lift-height change of the needle 35 during the second lift-up period Tqr2 is evaluated through approximating the lift-height change by a quadratic equation for evaluating the second lift-up waveform. Therefore, the computational load on the ECU 5 can be reduced, and the man-hour for adaptation associated with a change in the specifications of the injector 3 can be reduced.

Since the quadratic equation for evaluating the second lift-up waveform includes the correction coefficient for correcting the initial speed change due to the pressure drop in the nozzle chamber 52, the lift-height change of the needle 35 in the second lift-up period Tqr2 can be determined with high accuracy.

Since the correction coefficient for correcting the initial speed change is evaluated by use of the nozzle hole flow rate Qff of the injector 3, the seat diameter Dns of the needle 35, and the volume of the suction chamber 56 of the injector 3, the lift-height change of the needle 35 during the second lift-up period Tqr2 can be determined with high accuracy.

In the first embodiment, the geometric shape of lift-height is determined through approximating the lift-height change of the needle 35 during the second lift-up period Tqr2 by use of the quadratic equation for evaluating the second lift-up waveform. In this case, the required injection amount Q is represented by a fourth order equation with respect to the injection period. However, since the injection period is determined from the required injection amount Q through a convergent computation, the computational load on the ECU 5 can be reduced.

In the first embodiment, the needle 35 is assumed to move up at a constant speed during the third lift-up period Tqr3, and the lift-height change of the needle 35 during the third lift-up period Tqr3 is evaluated through approximating the lift-height change of the needle 35 by the linear equation for evaluating the third lift-up waveform. Therefore, the computational load on the ECU 5 can be reduced, and the man-hour for adaptation associated with a change in the specifications of the injector 3 can be reduced.

In the linear equation for evaluating the third lift-up waveform, the needle 35 is assumed to move up at a constant speed while the pressure in the control chamber 33 and the pressure in the nozzle chamber 52 are balanced. Therefore, the computational load on the ECU 5 can be reduced, and the man-hour for adaptation associated with a change in the specifications of the injector 3 can be reduced.

In the linear equation for evaluating the third lift-up waveform, the volume of the control chamber 33 is assumed to be reduced by the difference between the inflow to the control chamber 33 and the outflow from the control chamber 33 while the pressure in the control chamber 33 is held constant. Therefore, the computational load on the ECU 5 can be reduced, and the man-hour for adaptation associated with a change in the specifications of the injector 3 can be reduced.

The pressure of the nozzle chamber 52 in the linear equation for evaluating the third lift-up waveform employs the nozzle hole flow rate Qff of the injector 3 as a parameter for computation. As the nozzle hole flow rate Qff increases, a drop of the injection pressure (the pressure in the nozzle chamber 52) becomes larger, resulting in a decrease of the lift-up speed Ld3 of the needle 35. Therefore, this decrease of the lift-up speed Ld3 of the needle 35 can be incorporated into the linear equation for evaluating the third lift-up waveform. Thus, the geometric shape of lift-height can be determined with high accuracy.

In the first embodiment, the injection termination delay period Tde from when the driving signal of the injector 3 is terminated to when the injection from the injector 3 is completed is divided into the first delay period Tde1' from when the driving signal is terminated to when the valve 47 of the electromagnetic valve 34 starts moving for valve closing, the second delay period Tde1" from when the valve 47 of the electromagnetic valve 34 starts moving for valve closing to when the needle 35 starts moving down after the pressure in the control chamber 33 reaches the valve closing pressure, and the third delay period Tde2 from when the needle 35 starts moving down after the pressure in the control chamber 33 reaches the valve closing pressure to when the needle 35 stops moving down and the injection is terminated. Subsequently, the necessary response period of each part is individually evaluated through modeling each of the first, second, and third delay periods Tde1', 1", and 2 by use of a simple physical equation. Therefore, the data size in the ECU 5 can be reduced, and the computational load on the ECU 5 can be reduced.

Even when a part of the specifications of the injector 3 is modified, it is sufficient that only the adaptation parameter of the modified part is changed. Therefore, the adaptation process associated with a change in the specifications of the injector 3 can be facilitated.

In the first embodiment, the fixed value Tde1 (the lift-down delay period) is employed as the first and second delay periods Tde1' and 1".

The first delay period Tde1' is basically an electrical delay in the period from when the driving signal is terminated to when the valve 47 of the electromagnetic valve 34 starts the closing operation upon turning off the electromagnetic valve 34. This is independent of the common rail pressure Pc (the fuel supply pressure) supplied to the injector 3 and is constant for injectors having the same specifications. Therefore, the first delay period Tde1' can be employed as a constant. The second delay period Tde1" is the period related to the pressure drop in the control chamber 33. However, if a constant value is employed as the second delay period Tde1", the computational accuracy is not largely affected.

Therefore, if the fixed value Tde1 (the lift-down delay period) is employed as the first and second delay periods Tde1' and 1", the computational accuracy is not largely affected.

In this manner, the computational load on the ECU 5 can be reduced through employing the fixed value Tde1 (the lift-down delay period) as the first and second delay periods Tde1' and 1". In addition, the man-hour for adaptation associated with a change in the specifications of the injector 3 can be reduced.

In the first embodiment, upon determining the geometric shape of lift-height, the lift-height change of the needle 35 during the third delay period Tde2, from when the needle 35 starts moving down to when the needle 35 stops moving down and the injection is terminated, is evaluated through approximating the lift-height change of the needle 35 by the linear equation for evaluating the lift-down waveform.

Therefore, the computational load on the ECU 5 can be reduced, and the man-hour for adaptation associated with a change in the specifications of the injector 3 can be reduced. In the linear equation for evaluating the lift-down waveform, the needle 35 is assumed to move down at a constant speed while the pressure in the control chamber 33 and the pressure in the nozzle chamber 52 are balanced. Therefore, the computational load on the ECU 5 can be reduced, and the man-hour for adaptation associated with a change in the specifications of the injector 3 can be reduced.

In the linear equation for evaluating the lift-down waveform, the volume of the control chamber 33 is assumed to be increased by the difference between the inflow to the control chamber 33 and the outflow from the control chamber 33 while the pressure in the control chamber 33 is held constant. Therefore, the computational load on the ECU 5 can be reduced, and the man-hour for adaptation associated with a change in the specifications of the injector 3 can be reduced.

The pressure of the nozzle chamber 52 in the linear equation for evaluating the lift-down waveform employs the nozzle hole flow rate Qff of the injector 3 as a parameter for computation. As the nozzle hole flow rate Qff increases, a drop of the injection pressure (the pressure in the nozzle chamber 52) becomes larger, resulting in an increase in the lift-down speed of the needle 35. Therefore, this increase in the lift-down speed of the needle 35 can be incorporated into the linear equation for evaluating the lift-down waveform.

In the first embodiment, a predicted pressure is evaluated through subtracting for each injection a pressure drop caused by the last injection from a base value which is an input value of the common rail pressure sensor 24 at the starting timing of the fuel injection of the first stage, and is employed as the common rail pressure Pc in the second and subsequent stages in the multiple injections.

In the second and subsequent stages in the multiple injections, a sensing error is generated in the input value of the common rail pressure sensor 24 due to a pressure pulsation. However, the common rail pressure Pc can be estimated through subtracting a pressure drop of the last injection. Therefore, the common rail pressure Pc can be determined with high accuracy and a small error, and the geometric shape of lift-height can be determined with high accuracy.

In the first embodiment, when the common rail pressure Pc (the fuel supply pressure) is employed in computation, a predicted pressure is evaluated through subtracting for each injection a pressure drop dP caused by the last injection from a base value which is an input value (the common rail pressure Pc) of the common rail pressure sensor 24 (the fuel supply pressure sensor) at the starting timing of the fuel injection of the first stage, and is employed as the common rail pressure Pc of the second and subsequent stages in the multiple injections.

In the second and subsequent stages in the multiple injections, a sensing error is generated in the input value of the common rail pressure sensor 24 due to a pressure pulsation. However, the common rail pressure Pc can be estimated through sequentially subtracting for each injection the pressure drop dP of the last injection from the common rail pressure Pc of the common rail pressure sensor 24 at the starting timing of the fuel injection of the first stage. Therefore, the common rail pressure Pc (the fuel supply pressure) applied to the injector 3 can be determined with high accuracy and a small error, and the geometric shape of lift-height can be determined with high accuracy.

In the first embodiment, when the effect of the pulsation on the common rail pressure Pc in the second and subsequent stages in the multiple injections is incorporated into the computation, the effect of pulsation is evaluated by use of a pulsation starting point obtained through shifting the end point of the last injection by a predetermined phase. In the third and subsequent stages, the effect of the pulsation in the first injection is also taken into account in addition to the effect of the pulsation in the last injection.

In this manner, the common rail pressure Pc can be determined with high accuracy. As a result, the geometric shape of lift-height can be determined with high accuracy.

In a second embodiment, the ECU 5 comprises a correction function for modifying the injection amount so as to reduce the deviation in engine speed sensed by the rotation sped sensor 22 or the like (e.g. a correction function for correcting fluctuation between cylinders).

Specifically, if the deviation in engine speed is sensed, the ECU 5 corrects at least one adjustment parameter selected from injection parameters (parameters for drawing the geometric shape of lift-height) such as the injection starting delay period Tds, the lift-up height change Lup, the lift-down height change Ldn, the lift-down delay period Tde1, the needle lift-up period Tqr, and the injector driving period Tqf in order to modify the injection amount for reducing the fluctuation. The corrected value of the adjustment parameters is stored in a memory device as a learning value which is to be used in the next and subsequent injections.

Of course, if the amount of the deviation in engine speed is changed, the correction function updates the corrected value of the adjustment parameters based on the changed amount, and stores the updated correction value of the adjustment parameters as an updated learning value. Therefore, the correction function is continuously operating to reduce deviation in the engine speed.

The reduction in the injection accuracy due to the performance variation among the individual fuel injection systems (the performance variation among the injectors 3) or the deterioration of the fuel injection system (e.g., the change of the seat diameter Dns) may be prevented through the correction function employing the leaning value.

In the correction function of the second embodiment described above, the correction is made to at least one adjustment parameter selected from the injection parameters which draw the geometric shape of lift-height.

On the other hand, in the correction function of a third embodiment, two or more adjustment parameters selected from the injection parameters are employed when the deviation in the injection amount is corrected. The selected adjustment parameters are weighted to correct the deviation in the injection amount. Each of the selected adjustment parameters is stored as a learning value to be used in the next and subsequent injections.

For a specific example, when the deviation in engine speed is sensed, the injection starting delay period Tds, the lift-up height change Lup, and the lift-down height change Ldn are employed as the adjustment parameters, and correction is made to these parameters for reducing the deviation. In this case, the injection starting delay period Tds is largely corrected (for example, a weighting factor of 6), and the lift-up height change Lup and the lift-down height change Ldn are lightly corrected (for example, a weighting factor of 2).

In this manner, the deviation in the injection amount due to the performance variation among the individual fuel injection systems or the deterioration of the fuel injection system can be corrected. In addition, the deviation in the injection timing (one or both of the injection start timing and the injection termination timing) can be corrected.

In the correction functions in the second and third embodiments, when the deviation in engine speed is sensed, the value of the injection parameters is directly corrected to reduce the deviation.

On the other hand, upon sensing the deviation in the engine speed, the correction function of a fourth embodiment assumes that the deviation is caused by a change in a specification parameter of a predetermined part which determines the specifications of the injector 3. The specification parameter of the predetermined part is employed as the adjustment parameter, and the adjustment parameter is stored as a leaning value to be used in the next and subsequent injections.

As a specific example, the injection starting delay period Tds is employed as the adjustment parameter.

As described in the first embodiment, the injection starting delay period Tds is evaluated from the common rail pressure Pc and the specifications of the injector 3.

When the deviation in the engine speed is detected, the correction function assumes that the deviation amount is due to a change in the seat diameter Dns which determines the specifications of the injector 3, and modifies the value of the seat diameter Dns.

The seat counterforce (the upper seat counterforce+the lower seat counterforce) is corrected through the modification. As a result, the value of the injection starting delay period Tds is corrected.

Through correcting the value of the seat diameter Dns alone, the other injection parameters (other than the injection starting delay period Tds, e.g., the lift-up height change Lup and the lift-down height change Ldn) evaluated by use of the seat diameter Dns are also corrected at the same time.

In this manner, through correcting a specification parameter of a predetermined part which determines the specifications of the injector 3, the injection parameters evaluated by use of the specification parameter are corrected at the same time. Therefore, since the corrected geometric shape of lift-height is obtained, secondary corrections (correction of the injection amount or the injection timing) may not be made.

In the embodiments described above, "the geometric shape of lift-height" approximated by the lift-height waveform of the needle 35 is determined as a geometric shape of an injection model, and the driving signal termination timing is evaluated through the use of the determined geometric shape of lift-height.

On the other hand, in a fifth embodiment, "the geometric shape of injection rate" approximated by the injection rate waveform of the injector 3 (the waveform of the injection rate change) is determined as the geometric shape of an injection model, and the driving signal termination timing is evaluated through the use of the determined geometric shape of injection rate.

Specifically, the ECU 5 of the fifth embodiment does not determine the "the geometric shape of lift-height", but directly determines "the geometric shape of injection rate" having an area corresponding to the required injection rate Q through the use of a technique similar to that for determining "the geometric shape of lift-height." The ECU 5 performs model injection control for evaluating the injector driving period Tqf (or the driving signal termination timing) from the driving signal generation timing to the driving signal termination timing through the use of "the geometric shape of injection rate."

As in the first embodiment, the relationship between "the geometric shape of injection rate" and "the geometric shape of lift-height" will be described.

As described in the operation of the injector 3, if the injection rate increase Qup dose not reach the maximum injection rate Qmax (e.g., a small injection), the geometric shape of injection rate having a nearly triangular shape (not exactly a triangle) is drawn by the time axis and the injection rates (the injection rate increase Qup and the injection rate decrease Qdn), as shown in FIG. 5.

At the same time, the geometric shape of lift-height having a nearly triangular shape (not exactly a triangle) is drawn by the time axis and the lift-heights (the lift-up height change Lup and the lift-down height change Ldn).

The geometric shape of lift-height has the same base side as the geometric shape of injection rate, but the height of the geometric shape of lift-height is different from the height of the geometric shape of injection rate.

Therefore, "the geometric shape of injection rate" can be determined through the use of a technique similar to that for determining "the geometric shape of lift-height."

On the other hand, when the injection rate increase Qup reaches the maximum injection rate Qmax (e.g., a large injection), the geometric shape of injection rate having a nearly trapezoidal shape (not exactly a trapezoid) is drawn by the time axis and the injection rates (the injection rate increase Qup, the maximum injection rate Qmax, and the injection rate decrease Qdn), as shown in FIG. 6.

At the same time, a geometric shape of lift-height having a nearly triangular shape (not exactly a triangle) is drawn by the time axis and the lift-heights (the lift-up height change Lup and the lift-down height change Ldn). Since the maximum injection rate Qmax is determined by a nozzle hole flow rate, the lift-height of the needle 35 at which the maximum injection rate Qmax is achieved can be determined by use of the specifications of the injector 3, and thus the lift-height of the needle 35 at which the maximum injection rate Qmax is achieved can be estimated in advance. Therefore, assuming that the lift-height of the needle 35 at which the maximum injection rate Qmax is achieved is given at an estimated maximum injection rate lift-height Lmax, "a geometric shape of virtual lift-height" having a nearly trapezoidal shape (not exactly a trapezoid) is drawn by the time axis, "the lift-up height change Lup, the estimated maximum injection rate lift-height Lmax and the lift-down height change Ldn."

The geometric shape of virtual lift-height has the same base and top sides as the geometric shape of injection rate, but the height of the geometric shape of virtual lift-height is different from the height of the geometric shape of injection rate.

Therefore, even when the injection rate increase Qup reaches the maximum injection rate Qmax, "the geometric shape of injection rate" can be determined through the use of a technique similar to that for determining "the geometric shape of lift-height."

In the fifth embodiment, "the geometric shape of injection rate" having an area corresponding to the required injection rate Q is determined through the use of a technique similar to that for determining "the geometric shape of lift-height" disclosed in the first embodiment. The injector driving period Tqf (or the driving signal termination timing) is evaluated through the use of "the geometric shape of injection rate," and thus excellent effect as in The first embodiment can be obtained.

In the embodiments described above, the effect of the pulsation generated in multiple injections is incorporated through the use of processing having a small computational load. However, the present invention is not limited to multiple injections, and is applicable, for example, to single injection in which one injection is performed in one cycle.

When the present invention is applied to multiple injections, the multiple injections may be even-multiple injections in which the injection amount in one cycle is almost evenly divided for a plurality of injections to be performed. Also, the present invention may be applied to multiple injections in which the injection in one cycle is divided into a very small injection and a main injection. In this case, one or a plurality of small injections may be performed before the main injection, after the main injection, or before and after the main injection.

In the embodiments described above, an electric valve such as the electromagnetic valve 34 which drives the valve 47 by the attraction force of the solenoid 46 is employed. However, any electromagnetic valve which employs other electrical actuator electrically driving the valve 47 may be employed. Examples of the electrical actuator include a piezo actuator driving the valve 47.

In the embodiments described above, the present invention is applied to a common rail type fuel injection system, but may be applied to a fuel injection system which does not employ a common rail. That is, the present invention may be applied to a fuel injection system employed in an engine other than a diesel engine such as a gasoline engine.

What is claimed is:

1. A fuel injection system for an internal combustion engine, comprising:
   an injector including a control chamber to which a fuel supply pressure is applied through an inflow passage and from which the fuel supply pressure is exhausted through an exhaust passage and an electric valve which opens and closes said exhaust passage, and which drive-controls a needle through controlling the pressure of said control chamber; and
   a control device for determining a required injection amount in accordance with an operation state of the internal combustion engine, and which controls a fuel injection amount injected from said injector through controlling said electric valve based on the required injection amount, wherein said control device includes injection model evaluation means for:
   determining a geometric shape defined by a time axis and a lift-height change of said needle, said geometrical shape having an area directly or indirectly corresponding to said required injection amount which is employed for evaluating an injector driving period, said injector driving period from a driving signal generation timing of said injector to a driving signal termination timing of said injector or the driving signal termination timing after the driving signal generation,
   dividing said lift-height change of said needle during the period from when said needle starts moving up to when said needle starts moving down into a plurality of portions upon determining said geometrical shape, said plurality of portions defined by:
   the lift-height change of said needle during a first lift-up period that occurs just after when said needle starts moving up,
   the lift-height change of said needle during a second lift-up period that occurs from an end of said first lift-up period to when the pressure in said control chamber becomes almost constant, and
   the lift-height change of said needle during a third lift-up period that occurs from the end of the second lift-up period to when said needle starts moving down; and
   evaluating said lift-height change of said needle in each of said first, second, and third lift-up periods based on a physical equation.

2. The fuel injection system according to claim 1, wherein the lift-height change of said needle during said first lift-up period is evaluated through approximating the lift-height change of said needle by a linear equation for evaluating a first lift-up waveform based on a lift-up speed of said needle.

3. The fuel injection system according to claim 2, wherein said linear equation for evaluating the first lift-up waveform employs a nozzle hole flow rate of said injector and a seat diameter of said needle as parameters for computation.

4. The fuel injection system according to claim 3, wherein an effect of a piping pulsation generated in a high pressure fuel piping which supplies high-pressure fuel to said injector is taken into account in utilizing a coefficient for said seat diameter involved in said linear equation for evaluating the first lift-up waveform.

5. The fuel injection system according to claim 3, wherein an effect of a control chamber pulsation generated in said control chamber is taken into account in utilizing the coefficient for said seat diameter involved in said linear equation for evaluating the first lift-up waveform.

6. The fuel injection system according to claim 1, wherein the lift-height change of said needle during said second lift-up period is evaluated through approximating the lift-height change of said needle, based on a quadratic curve-like lift-height increase of said needle, by a quadratic equation for evaluating a second lift-up waveform.

7. The fuel injection system according to claim 6, wherein coefficients in said quadratic equation for evaluating the second lift-up waveform are determined through solving simultaneous equations involving the gradients of the lift-up speed of said needle at both the ends of said second lift-up period, and a lift-height of said needle at the end of said first lift-up period.

8. The fuel injection system according to claim 6, wherein said quadratic equation for evaluating the second lift-up waveform includes a correction coefficient for correcting an initial speed change of said needle due to a pressure drop in a nozzle chamber of said injector.

9. The fuel injection system according to claim 8, wherein said correction coefficient is evaluated by use of a nozzle hole flow rate of said injector, the seat diameter of said needle, and the volume of a suction chamber of said injector.

10. The fuel injection system according to claim 6, wherein
    said required injection amount is represented by a fourth order equation with respect to an injection period upon determining said geometric shape of lift-height through approximating the lift-height change of said needle during said second lift-up period by use of said quadratic equation for evaluating the second lift-up waveform, and the injection period is determined from said required injection amount through a convergent computation.

11. The fuel injection system according to claim 1, wherein the lift-height change of said needle during said third lift-up period is evaluated through approximating the lift-height change of said needle by a linear equation for evaluating a third lift-up waveform based on the lift-up speed of said needle.

12. The fuel injection system according to claim 11, wherein
said linear equation for evaluating the third lift-up waveform is an equation in which said needle is assumed to move up at a constant speed while the pressure in said control chamber and the pressure in the nozzle chamber are balanced.

13. The fuel injection system according to claim 12, wherein
said linear equation for evaluating the third lift-up waveform is an equation in which the volume of said control chamber is assumed to be reduced by the difference between the inflow to said control chamber and the outflow from said control chamber while the pressure in said control chamber is held constant.

14. The fuel injection system according to claim 11, wherein
the pressure of said nozzle chamber in said linear equation for evaluating the third lift-up waveform employs the nozzle hole flow rate of said injector as a parameter for computation.

15. The fuel injection system according to claim 1, wherein
said control device divides an injection termination delay period from when the driving signal is terminated in said injector to when the injection from said injector is completed into a first delay period from when the driving signal is terminated to when the electric valve starts moving for closing, a second delay period from when the electric valve starts moving for closing to when said needle starts moving down after the pressure in said control chamber reaches a valve closing pressure, and a third delay period from when said needle starts moving down after the pressure in said control chamber reaches the valve closing pressure to when said needle stops moving down and the injection is terminated, and evaluates each of said first, second, and third delay periods by use of a simple physical equation.

16. The fuel injection system according to claim 15, wherein
a fixed value is employed as said first and second delay periods.

17. The fuel injection system according to claim 1, wherein
said control device evaluates the lift-height change of said needle during the third delay period from when said needle starts moving down to when said needle stops moving down and the injection is terminated by approximating the lift-height change of said needle with a linear equation for evaluating a lift-down waveform upon determining said geometric shape of lift-height as having an area corresponding to said required injection amount.

18. The fuel injection system according to claim 17, wherein
said linear equation for evaluating the lift-down waveform is an equation in which said needle is assumed to move down at a constant speed while the pressure in said control chamber and the pressure in the nozzle chamber are balanced.

19. The fuel injection system according to claim 18, wherein
said linear equation for evaluating the lift-down waveform is an equation in which the volume of said control chamber is assumed to be increased by the difference between the inflow to said control chamber and the outflow from said control chamber while the pressure in said control chamber is held constant.

20. The fuel injection system according to claim 17, wherein
the pressure of said nozzle chamber in said linear equation for evaluating the lift-down waveform employs the nozzle hole flow rate of said injector as a parameter for computation.

21. The fuel injection system according to claim 1, wherein
a fuel supply pressure of the second and subsequent stages in multiple injections in which the fuel injection in one cycle is divided into a plurality of fuel injections employs a value evaluated through subtracting for each injection a pressure drop caused by the last injection from a base value which is an input value of a fuel supply pressure sensor at the starting timing of the fuel injection of the first stage.

22. The fuel injection system according to claim 21, wherein
the effect of the pulsation occurring on the fuel supply pressure in the second and subsequent stages is evaluated by use of a pulsation starting point obtained through shifting the end point of the last injection by a predetermined phase.

23. The fuel injection system according to claim 22, wherein
the pulsation starting point of the first stage is also taken into account upon evaluating the effect of the pulsation occurring on the fuel supply pressure in the third and subsequent stages.

24. A fuel injection system for an internal combustion engine, comprising:
an injector which includes a control chamber to which a fuel supply pressure is applied through an inflow passage and from which the fuel supply pressure is exhausted through an exhaust passage and an electric valve which opens and closes said exhaust passage, and which drive-controls a needle through controlling the pressure of said control chamber; and
a control device for determining a required injection amount in accordance with an operation state of the internal combustion engine, and which controls a fuel injection amount injected from said injector through controlling said electric valve based on the required injection amount, wherein said control device includes an injection model evaluation means for:
determining a geometric shape defined by a time axis and an injection rate change of said injector, said geometric shape having an area corresponding to said required injection amount and being employed for evaluating an injector driving period from a driving signal generation timing of said injector to a driving signal termination timing of said injector or the driving signal termination timing after the driving signal generation,
dividing an injection rate change during the period defined from when said needle starts moving up to when said needle starts moving down into a plurality of portions upon determining said geometric shaper, said plurality of portions including:

an injection rate change in a first lift-up period that occurs just after said needle starts moving up, an injection rate change in a second lift-up period that occurs from an end of the first lift-up period to when the pressure in said control chamber becomes almost constant, and an injection rate change in a third lift-up period that occurs from an end of the second lift-up period to when said needle starts moving down; and evaluating the injection rate change in each of said first, second, and third lift-up periods by use of a physical equation.

25. The fuel injection system according to claim 24, wherein
the injection rate change during said first lift-up period is evaluated through approximating the injection rate change by a linear equation for evaluating a first lift-up waveform by use of the constant increasing speed of the injection rate.

26. The fuel injection system according to claim 25, wherein
said linear equation for evaluating the first lift-up waveform employs a nozzle hole flow rate of said injector and a seat diameter of said needle as a parameter for computation.

27. The fuel injection system according to claim 26, wherein
an effect of a piping pulsation generated in a high pressure fuel piping supplying high-pressure fuel to said injector is taken into account in a coefficient for said seat diameter involved in said linear equation for evaluating the first lift-up waveform.

28. The fuel injection system according to claim 26, wherein
an effect of a control chamber pulsation generated in said control chamber is taken into account in utilizing the coefficient for said seat diameter involved in said linear equation for evaluating the first lift-up waveform.

29. The fuel injection system according to claim 24, wherein
the injection rate change during said second lift-up period is evaluated through approximating the injection rate change by a quadratic equation for evaluating a second lift-up waveform based on a quadratic curve-like lift-height increase of the injection rate.

30. The fuel injection system according to claim 29, wherein
coefficients in said quadratic equation for evaluating the second lift-up waveform are determined through solving simultaneous equations involving the gradients of the injection rate at both ends of said second lift-up period, and an injection rate at an end of said first lift-up period.

31. The fuel injection system according to claim 29, wherein
said quadratic equation for evaluating the second lift-up waveform includes a correction coefficient for correcting an initial change of the injection rate due to the pressure drop in a nozzle chamber of said injector.

32. The fuel injection system according to claim 31, wherein
said correction coefficient is evaluated by use of a nozzle hole flow rate of said injector, the seat diameter of said needle, and the volume of a suction chamber of said injector.

33. The fuel injection system according to claim 29, wherein said required injection amount is represented by a fourth order equation with respect to an injection period upon determining the geometric shape of injection rate through approximating the injection rate change during said second lift-up period by use of said quadratic equation for evaluating the second lift-up waveform, and the injection period is determined from said required injection amount through a convergent computation.

34. The fuel injection system according to claim 24, wherein
the injection rate change during said third lift-up period is evaluated through approximating the injection rate change by a linear equation for evaluating the a lift-up waveform by use of a constant increasing speed of the injection rate.

35. The fuel injection system according to claim 34, wherein
said linear equation for evaluating the third lift-up waveform is an equation in which said needle is assumed to move up at a constant speed while the pressure in said control chamber and the pressure in the nozzle chamber are balanced.

36. The fuel injection system according to claim 35, wherein
said linear equation for evaluating the third lift-up waveform is an equation in which the volume of said control chamber is assumed to be reduced by the difference between the inflow to said control chamber and the outflow from said control chamber while the pressure in said control chamber is held constant.

37. The fuel injection system according to claim 34, wherein
the pressure of said nozzle chamber in said linear equation for evaluating the third lift-up waveform employs the nozzle hole flow rate of said injector as a parameter for computation.

38. The fuel injection system according to claim 24, wherein said control device:
divides an injection termination delay period from when the driving signal is terminated in said injector to when the injection from said injector is completed into a first delay period from when the driving signal is terminated to when the electric valve starts moving for closing, a second delay period from when the electric valve starts moving for closing to when said needle starts moving down after the pressure in said control chamber reaches the valve closing pressure, and a third delay period from when said needle starts moving down after the pressure in said control chamber reaches the valve closing pressure to when said needle stops moving down and the injection is terminated; and evaluates each of said first, second, and third delay periods use of a simple physical equation.

39. The fuel injection system according to claim 38, wherein
a fixed value is employed as said first and second delay periods.

40. The fuel injection system according to claim 24, wherein
upon determining the geometric shape of injection rate having an area corresponding to said required injection amount, said control device evaluates the injection rate change during said third delay period from when said needle starts moving down to when said needle stops moving down and the injection is terminated, through approximating the injection rate change by a linear equation for evaluating a lift-down waveform by use of a constant decreasing speed of the injection rate.

41. The fuel injection system according to claim 40, wherein
said linear equation for evaluating the lift-down waveform is an equation in which said needle is assumed to move down at a constant speed while the pressure in said control chamber and the pressure in the nozzle chamber are balanced.

42. The fuel injection system according to claim 41, wherein
said linear equation for evaluating the lift-down waveform is an equation in which the volume of said control chamber is assumed to be increased by the difference between the inflow to said control chamber and the outflow from said control chamber while the pressure in said control chamber is held constant.

43. The fuel injection system according to claim 40, wherein
the pressure of said nozzle chamber in said linear equation for evaluating the lift-down waveform employs the nozzle hole flow rate of said injector as a parameter for computation.

44. The fuel injection system according to claim 24, wherein
a fuel supply pressure of the second and subsequent stages in multiple injections in which the fuel injection in one cycle is divided into a plurality of fuel injections employs a value evaluated through subtracting for each injection a pressure drop caused by the last injection from a base value which is an input value of a fuel supply pressure sensor at the starting timing of the fuel injection of the first stage.

45. The fuel injection system according to claim 44, wherein
the effect of the pulsation occurring on the fuel supply pressure in the second and subsequent stages is evaluated by use of a pulsation starting point obtained through shifting the end point of the last injection by a predetermined phase.

46. The fuel injection system according to claim 45, wherein
the pulsation starting point of the first stage is also taken into account upon evaluating the effect of the pulsation generated in a third and subsequent stages.

* * * * *